United States Patent [19]
Sawada

[11] Patent Number: 5,890,776
[45] Date of Patent: Apr. 6, 1999

[54] BRAKING APPARATUS FOR AUTOMOTIVE VEHICLES

[75] Inventor: Mamoru Sawada, Yokkaichi, Japan

[73] Assignee: Denso Corporation, Kariya, Japan

[21] Appl. No.: 845,416

[22] Filed: Apr. 25, 1997

[30] Foreign Application Priority Data

Apr. 26, 1996 [JP] Japan .................................. 8-108281
Apr. 26, 1996 [JP] Japan .................................. 8-108286

[51] Int. Cl.⁶ ...................................................... B60T 8/32
[52] U.S. Cl. .......................... 303/116.1; 303/10; 303/166; 303/113.4; 303/9.62; 303/113.5; 303/119.1; 303/115.4; 303/155
[58] Field of Search .................................. 303/155, 121, 303/166, 169–199, 113.1–119.2, 15, 20, 7–9, 9.62, 10–11, 122.11; 701/71, 79; 188/181 C, 181 A

[56] References Cited

U.S. PATENT DOCUMENTS

| | | |
|---|---|---|
| 4,133,414 | 1/1979 | Ushitani . |
| 4,478,459 | 10/1984 | Cumming . |
| 4,505,520 | 3/1985 | Maehara .............................. 188/181 C |
| 4,674,805 | 6/1987 | Leiber .................................... 303/114.1 |
| 5,022,716 | 6/1991 | Siegel et al. .......................... 303/114.1 |
| 5,123,175 | 6/1992 | Okubo . |
| 5,241,479 | 8/1993 | Matsuda et al. . |
| 5,261,730 | 11/1993 | Steiner et al. ........................ 303/113.4 |
| 5,271,666 | 12/1993 | Okubo . |
| 5,607,209 | 3/1997 | Narita et al. ........................ 303/122.11 |
| 5,700,069 | 12/1997 | Yokoyama et al. ................... 303/115.2 |

FOREIGN PATENT DOCUMENTS

| | | |
|---|---|---|
| 3410083 | 10/1984 | Germany . |
| 4028290 | 1/1992 | Germany . |
| 4208496 | 8/1993 | Germany . |
| 4332451 | 3/1995 | Germany . |
| 4413172 | 3/1995 | Germany . |
| 54-09878 | 4/1979 | Japan . |
| 59-05955 | 4/1984 | Japan . |
| 60-128057 | 7/1985 | Japan . |
| 62-143757 | 6/1987 | Japan . |
| 2-010167 | 1/1990 | Japan . |
| 2-021982 | 5/1990 | Japan . |
| 2-124331 | 5/1990 | Japan . |
| 3-132461 | 6/1991 | Japan . |
| 3-239653 | 10/1991 | Japan . |
| 4-059458 | 2/1992 | Japan . |
| 5-039020 | 2/1993 | Japan . |
| 5-503901 | 6/1993 | Japan . |
| 5-319124 | 12/1993 | Japan . |
| 5-319239 | 12/1993 | Japan . |
| 6-144176 | 5/1994 | Japan . |
| 6-183320 | 7/1994 | Japan . |
| 6-211122 | 8/1994 | Japan . |
| 2 129 518 | 5/1984 | United Kingdom . |

Primary Examiner—Douglas C. Butler
Attorney, Agent, or Firm—Pillsbury Madison & Sutro LLP

[57] ABSTRACT

When a driver wants to stop a vehicle quickly, the driver depresses a braking pedal strongly. A stop switch is turned on. The deceleration of the vehicle exceeds a predetermined value. In this case, an electronic control unit ECU actuates a pump to send brake fluid from a master cylinder to a wheel cylinder. Thus, the hydraulic braking pressure applied to the wheel cylinder is increased to a level higher than that obtained by a driver's braking pedal depression. Accordingly, the braking force increases at a speed exceeding a driver's foot braking operation without any further burden on the driver. The braking performance can be improved with a prompt increase of the braking force in response to a strong braking operation. Furthermore, utilizing an increased braking force makes it possible to eliminate an imbalance between wheel braking behaviors.

15 Claims, 17 Drawing Sheets

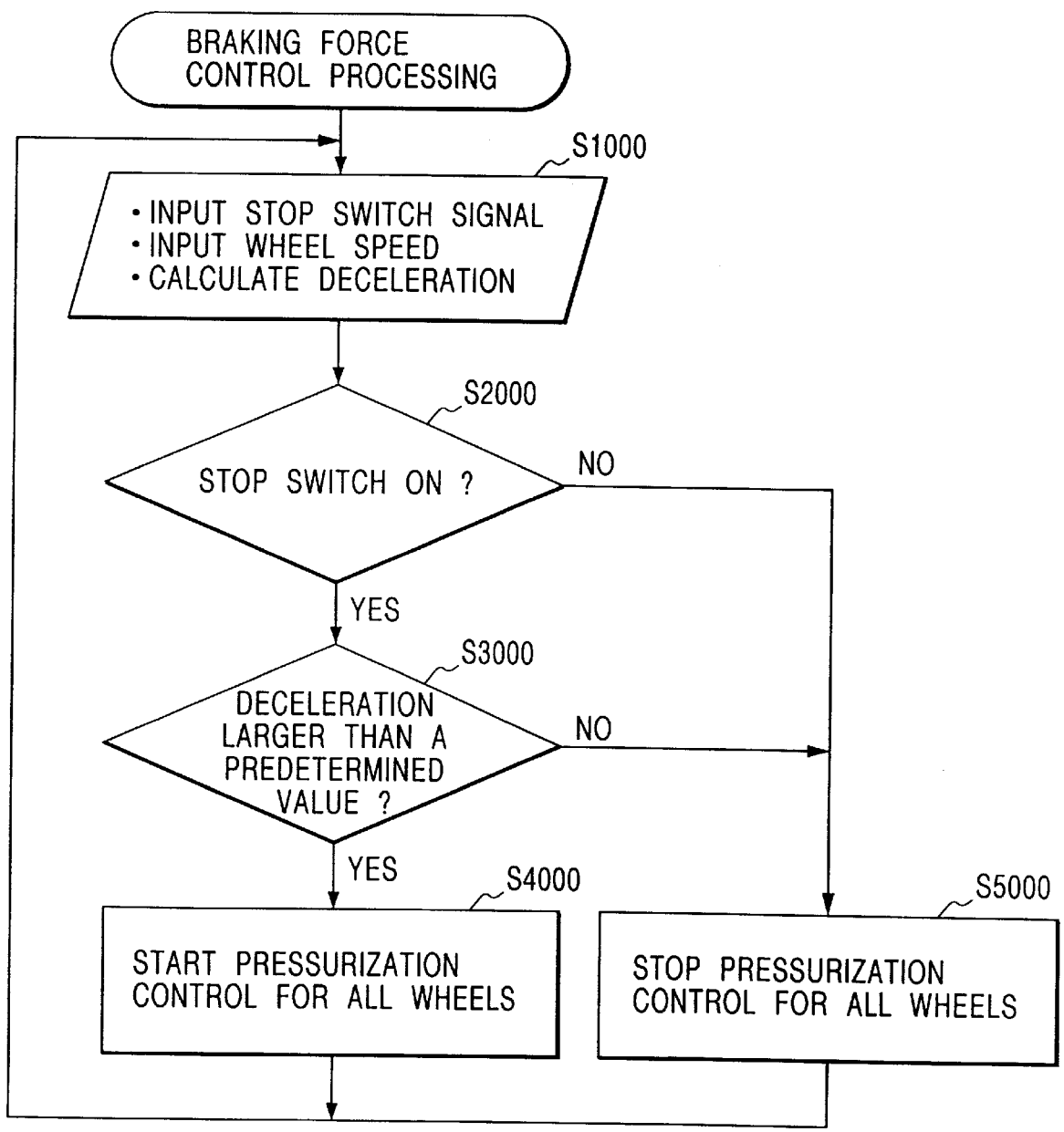

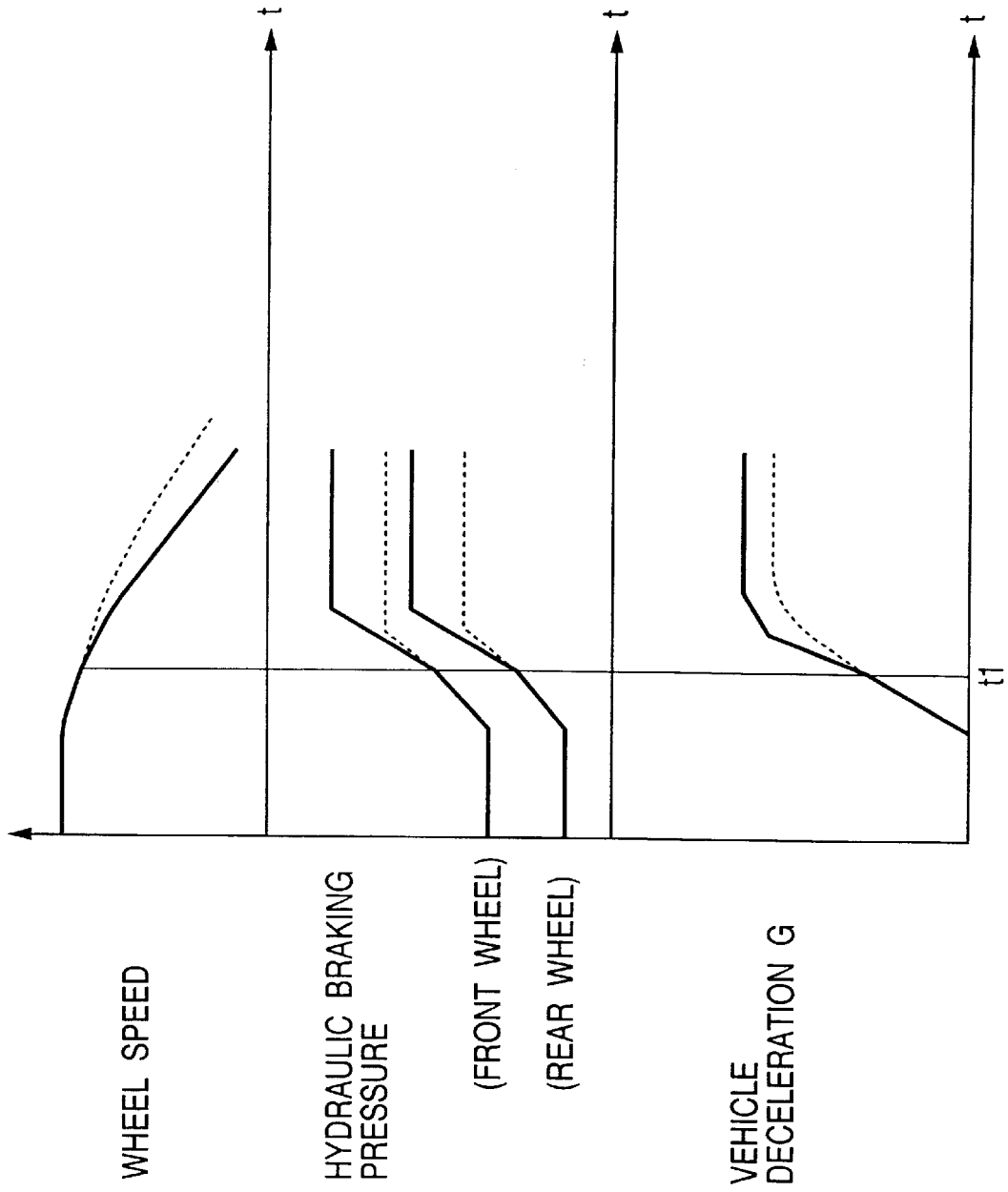

BRAKING APPARATUS FOR AUTOMOTIVE VEHICLES

BACKGROUND OF THE INVENTION

1. Field of the Invention:

This invention relates to a braking apparatus for automotive vehicles.

2. Related Art:

During a braking operation of a vehicle, a driver typically depresses a braking pedal to generate a hydraulic braking pressure that is applied to wheels of the vehicle for braking them. In an emergency case, the driver will want to stop the vehicle as quickly as possible. Therefore, the driver depresses the braking pedal strongly to generate a large braking force to be applied to the wheels.

However, as long as the braking operation is controlled by the depressing force of the driver's foot, the limited speed at which the braking pedal can be depressed will, to a certain degree limit the rate at which the strength of the braking operation can be increased. Therefore, the increase of the braking force is not satisfactorily fast. Even if an assisted braking device is provided, it merely amplifies the magnitude of a depressing force. The depressing speed itself is not increased sufficiently.

Furthermore, to stabilize a vehicle body during a braking condition, an adjustment of a braking force applied to each wheel is typically performed so as to lock front wheels early. For example, as indicated by a solid line in FIG. 20, a distribution between a front wheel braking force and a rear wheel braking force is usually designed or preset to cross a line representing a front wheel locking limit.

For this reason, there is a time lag between an initiation of an anti-skid control for front wheels and an initiation of an anti-skid control for rear wheels.

Accordingly, after the anti-skid control is started for the front wheels, a driver needs to depress a braking pedal by a significant stroke equivalent to a position Bm representing the maximum braking force for the rear wheels. Therefore, as shown in FIG. 21, a significant amount of pedal depression force is necessary. More specifically, in a section I of FIG. 21, the deceleration G is not increased regardless of an increase of the pedal depression force. Then, in a section II, the rear wheel braking force is gradually increased with increasing pedal depression force. Thus, the obtainable deceleration G is not so large.

An overly long period of time is therefore required to increase the braking force of all wheels to the maximum value. The braking performance will therefore be undesirably affected.

In other words, different behaviors of different wheels, if occuring during a braking condition, will cause a problem in braking performance. Even if all wheels are designed or preset to have similar behaviors at the beginning, such settings will be differentiated by a loading weight that flexibly varies the weight balance. In such a case, there is a possibility that a rear locking limit line may be crossed early. Therefore, setting the same behavior to all wheels from the beginning is extremely difficult.

SUMMARY OF THE INVENTION

A principal object of the present invention is to provide a braking apparatus for automotive vehicles that can quickly increase a braking force applied to wheels without increasing a burden imposed on the vehicle driver in an event of a strong braking operation, thereby improving the braking performance.

Another object of the present invention is to provide a braking force to wheel cylinders at a higher speed exceeding a driver's manual (foot) operation.

In order to accomplish this and other related objects, the present invention provides a braking apparatus having various aspects which will be described hereinafter with reference to numerals in parentheses which show the correspondence to the components disclosed in the preferred embodiments of the present invention described later.

Reference numerals in parentheses, added in the following description, are merely used for the purpose of facilitating the understanding to the present invention and not used for narrowly interpreting the scope of claims of the present invention.

The present invention provides a braking apparatus for automotive vehicles characterized in that an increased braking force is applied to a wheel at a speed faster than a driver's foot braking operation to optimize a braking behavior of the wheel during a vehicle braking condition.

More specifically, the increased braking force is applied to the wheel when a deceleration of a vehicle body or the wheel is larger than a predetermined value during the vehicle braking condition.

When the driver intends to stop immediately with a large deceleration, the driver's operation tends to become strong in accordance with a desire for the immediate stop. The deceleration or its variation amount of a vehicle or its wheel becomes large correspondingly. The present invention detects such an immediate vehicle braking condition based on sensor signals representing the deceleration or its variation amount of the vehicle or its wheel. The present invention increases the level of a braking force applied to the wheels. Thus, without increasing the burden on the driver, the braking force can be increased quickly at a speed exceeding the driver's foot braking operation.

Accordingly, the braking performance can be improved with a prompt increase of the braking force in response to a strong braking operation. Especially, detecting a deceleration change amount is effective to sense precisely the driver's desire for such an immediate stop. Thus, the braking force can be increased quickly at a speed exceeding the driver's foot braking operation without increasing the burden on the driver.

More specifically, the braking apparatus comprises braking condition detecting means (50, 51; 550, 501; S1000) for detecting a braking condition of an automotive vehicle, deceleration detecting means (50, 50a–50d; 550, 550a–550d; S1000) for detecting a deceleration amount of a vehicle body or a wheel, and braking force control means (50, 101, 101', 102, 102'; 550, 601, 601', 602, 602'; S2000, S3000, S4000) for increasing a braking force applied to the wheel when any braking condition is detected by the braking condition detecting means and the deceleration amount detected by the deceleration detecting means exceeds a predetermined value.

Preferably, the braking apparatus comprises the following features. Hydraulic braking pressure generating means (3, 503) generates a hydraulic braking pressure in accordance with a brake operating condition representing a driver's braking operation. A plurality of wheel braking force generating means (4, 5, 4', 5', 504, 505, 504', 505') are associated with wheels for receiving the hydraulic braking pressure from the hydraulic braking pressure generating means and supplying a braking force to an associated wheel. A piping system (A, A1, A2, B, A', A1', A2', B') is provided for communicating the hydraulic braking pressure generating means with each of the plurality of wheel braking force generating means. Braking condition detecting means (50, 51; 550, 501; S1000) detects a braking condition of an automotive vehicle. Deceleration detecting means (50, 50a–50d; 550, 550a–550d; S1000) detects a deceleration amount of a vehicle body or a wheel. And, braking force control means (50, 101, 101'; 550, 601, 601'; S2000, S3000, S4000) increases the level of the hydraulic braking pressure applied to at least one of the plurality of wheel braking force generating means, when any braking condition is detected by the braking condition detecting means and the deceleration amount detected by the deceleration detecting means exceeds a predetermined value.

Furthermore, the increased braking force is applied to the wheel when a deceleration change of a vehicle body or the wheel is larger than a predetermined value during a vehicle braking condition.

More specifically, the braking apparatus comprising braking condition detecting means (50, 51; 550, 501; S1000') for detecting a braking condition of an automotive vehicle, deceleration change detecting means (50, 50a–50d; 550, 550a–550d; S1000') for detecting a deceleration change amount of a vehicle body or a wheel, and braking force control means (50, 101, 101', 102, 102'; 550, 601, 601', 602, 602'; S2000, S3000', S4000) for increasing a braking force applied to the wheel when any braking condition is detected by the braking condition detecting means and the deceleration change amount detected by the deceleration change detecting means exceeds a predetermined value.

Preferably, the braking apparatus comprises the following features. Hydraulic braking pressure generating means (3, 503) generates a hydraulic braking pressure in accordance with a brake operating condition representing a driver's braking operation. A plurality of wheel braking force generating means (4, 5, 4', 5', 504, 505, 504', 505') are associated with wheels for receiving the hydraulic braking pressure from the hydraulic braking pressure generating means and supplying a braking force to an associated wheel. A piping system (A, A1, A2, B, A', A1', A2', B') is provided for communicating the hydraulic braking pressure generating means with each of the plurality of wheel braking force generating means. Braking condition detecting means (50, 51; 550, 501; S1000') detects a braking condition of an automotive vehicle. Deceleration change detecting means (50, 50a–50d; 550, 550a–550d; S1000') detects a deceleration change amount of a vehicle body or a wheel. And, braking force control means (50, 101, 101', 102, 102'; 550, 601, 601', 602, 602'; S2000, S3000', S4000) increases the level of the hydraulic braking pressure applied to at least one of the plurality of wheel braking force generating means, when any braking condition is detected by the braking condition detecting means and the deceleration change amount detected by the deceleration change detecting means exceeds a predetermined value.

Preferably, the hydraulic braking pressure supplied to all wheels can be increased. It is also preferable to increase the hydraulic braking pressure supplied to the rear wheels only.

From the view point of improving the vehicle stabilization during a braking operation, an increase of the braking force applied to the rear wheels is usually delayed compared with the front wheels to prevent any early locking of the rear wheels. Thus, there is a tendency that the braking force applied to the rear wheels is not increased so quickly. According to one aspect of the present invention, the hydraulic braking pressure applied to the rear wheels can be exclusively increased only when the deceleration or its change amount is larger than the predetermined value. Accordingly, the braking force as a whole can be increased promptly. The above-described functions and effects can be obtained.

More specifically, the braking force control means comprises delivery means (101, 101') for drawing up brake fluid from the hydraulic braking pressure generating means and delivering the brake fluid to a designated wheel braking force generating means, so as to increase the hydraulic braking pressure applied to the designated wheel braking force generating means to a level higher than that of the hydraulic braking pressure generating means.

With this arrangement, the hydraulic braking pressure in the hydraulic braking pressure generating means is reduced. A reaction force caused against a driver's braking operation can be reduced. The braking operation can be simplified.

Furthermore, the braking force control means may comprise storage means (503a) and the delivery means (601, 601'). The storage means (503a) is disposed independently of the piping system connecting the hydraulic braking pressure generating means to each of the plurality of wheel braking force generating means, for storing a predetermined amount of brake fluid. The delivery means (601, 601') draws up brake fluid from the storage means and delivers the brake fluid to a designated wheel braking force generating means, so as to increase the hydraulic braking pressure applied to the designated wheel braking force generating means to a level higher than that of the hydraulic braking pressure generating means.

With this arrangement, brake fluid stored in the storage means such as a reservoir can be used effectively. And, the braking performance can be improved with elimination of any lack of brake fluid in the hydraulic braking pressure generating means.

Still further, the braking apparatus may comprise holding means (102, 102', 601, 601') for holding an increased hydraulic braking pressure produced by the delivery means. The holding means may hold a ratio of the hydraulic braking pressure (PL) in the piping system (A2) connecting a brake fluid outlet of the delivery means and the designated wheel braking force generating means to the hydraulic braking pressure (PU) produced from the hydraulic braking pressure generating means.

Yet further, the holding means is a control valve (109, 110) disposed in the piping system and having a first control condition where the piping system is in a communicating condition and a second control condition where a differential pressure within a predetermined value is allowed between the hydraulic braking pressure supplied to the designated wheel braking force generating means and the hydraulic braking pressure produced from the hydraulic braking pressure generating means. In this case, a brake fluid outlet of the delivery means is located between the control valve of the piping system and the designated wheel braking force generating means. And, the control valve is situated in the second control condition when the brake fluid is delivered from the delivery means.

Yet further, the braking apparatus may comprises the following features. A pressurization control valve (300, 300', 800, 800') is provided in the piping system for each wheel for opening the piping system during a non-regulated condition and a pressurized regulating condition and for closing the piping system during a depressurized regulating condition. A depressurization control valve (302, 302', 802, 802') is provided in a depressurizing passage connecting the piping system to the storage means for each wheel for opening the depressurizing passage during the depressurized regulating condition and for closing the depressurizing passage during the pressurized regulating condition and the non-regulated condition. Hydraulic braking pressure regulating means (100, 600, ECU; i.e., anti-skid control apparatus) controls both of the pressurization control valve and the depressurization control valve to regulate the hydraulic braking pressure applied to the designated wheel braking force generating means in accordance with a road surface limit during a braking condition of an associated wheel, so as to optimize the braking behavior of the wheel. And, the delivery means delivers the brake fluid to the piping system located between the pressurization control valve and the holding means.

It will be preferable to increase the hydraulic braking pressure applied to all wheels uniformly under the control of the braking force control means. The braking force control means may differentiate a pressurization degree of the brake fluid for each wheel. The braking force control means may give a pressurization degree of the brake fluid for rear wheels set larger than a pressurization degree for front wheels. And, the hydraulic braking pressure regulating means may operate for depressurizing a certain wheel, while the delivery means may utilize brake fluid drained from the certain wheel to increase the hydraulic braking pressure of other wheel that is not operated by the hydraulic braking pressure regulating means. With this arrangement, the drained brake fluid can be circulated and used effectively.

The wheels controlled by the above-described braking apparatus may comprise driving wheels only, or both of the driving wheels and the driven wheels. The automotive vehicle applied the above-described braking apparatus may be a two-wheeled vehicle, a three-wheeled vehicle, a four-wheeled vehicle or any other vehicles.

Moreover, the present invention provides the braking apparatus for automotive vehicles wherein the braking behavior is controlled to eliminate any wheel behavior difference between wheels during a braking condition. Accordingly, the braking force is uniformly increased for each wheel during a braking condition. An adequate balance is maintained. Thus, the rear wheel locking limit is not crossed early. A sufficiently high braking performance is obtained.

More specifically, the braking apparatus comprises wheel behavior difference detecting means (ECU, S8000) for detecting a wheel behavior difference between wheels during a braking condition, and behavior control means (100, 600, ECU, S9000) for controlling a wheel behavior based on the wheel behavior difference detected by the wheel behavior difference detecting means so as to eliminate any wheel behavior difference. Detecting the wheel behavior difference and eliminating any wheel behavior difference based on the detected result makes it sure to bring the previously described effects.

Preferably, the braking apparatus for automotive vehicles comprises the following features. Hydraulic braking pressure generating means (3, 503) generates a hydraulic braking pressure in accordance with a brake operating condition representing a driver's braking operation. A plurality of wheel braking force generating means (4, 4', 504, 504') are associated with wheels for receiving the hydraulic braking pressure from the hydraulic braking pressure generating means and supplying a braking force to an associated wheel. A piping system (A, A1, A2) is provided for communicating the hydraulic braking pressure generating means with each of the plurality of wheel braking force generating means. Wheel behavior difference detecting means (ECU, S8000) detects a wheel behavior difference between wheels during a braking condition. And, wheel behavior difference eliminating means (100, 600, ECU, S9000) regulates a hydraulic braking pressure applied to an intended wheel braking force generating means based on a detection result obtained from the wheel behavior difference detecting means, so as to eliminate any wheel behavior difference.

With this arrangement, the hydraulic braking pressure is surely regulated and any wheel behavior difference can be eliminated. The hydraulic braking pressure plays an important roll in the wheel behavior during a braking condition. Thus, regulating the hydraulic braking pressure to eliminate the wheel behavior difference during the braking condition is effective to simplify the elimination of the wheel behavior difference.

Furthermore, the wheel behavior difference, such as wheel speed and slip rate, during a braking condition is chiefly caused due to the lack of a braking force applied to a certain wheel compared with a sufficient braking force applied to other wheel. In short, a somewhat lower hydraulic braking pressure supplied to the concerned wheel is a cause for it. Therefore, the wheel behavior difference eliminating means increases the hydraulic braking pressure applied to the intended wheel braking force generating means to a level higher than the hydraulic braking pressure generated from the hydraulic braking pressure generating means, thereby eliminating the wheel behavior difference.

To realize the above-described function, the wheel behavior difference eliminating means comprises storage means (200, 700), disposed independently of the piping system connecting the hydraulic braking pressure generating means to each of the plurality of wheel braking force generating means, for storing a predetermined amount of brake fluid, and delivery means (101, 101', 611, 611') for drawing tip-brake fluid from the storage means and delivering the drawn-up brake fluid to a designated wheel braking force generating means, so as to increase the hydraulic braking pressure applied to the designated wheel braking force generating means to a level higher than that of the hydraulic braking pressure generating means.

Alternatively, instead of providing the storage means (200, 700), it is desirable to provide holding means (90, 610) in a piping passage connecting the hydraulic braking pressure generating means and each wheel braking force generating means for holding a pressure difference between the hydraulic braking pressure of the hydraulic braking pressure generating means and the hydraulic braking pressure of each wheel braking force generating means. In this case, the wheel behavior difference eliminating means (100, 600, ECU) draws up brake fluid existing between the hydraulic braking pressure generating means and the holding means and delivers the drawn-up brake fluid to an intermediate portion between the holding means and the wheel braking force generating means so as to increase the level of the hydraulic braking pressure applied to the wheel braking force generating means to eliminate the wheel behavior difference.

With the arrangement, the brake fluid existing between the hydraulic braking pressure generating means and the holding means is drawn up. In accordance with the reduction of the brake fluid amount in this region, the hydraulic braking pressure is reduced. The hydraulic braking pressure received by or produced from the hydraulic braking pressure generating means is reduced correspondingly. For this reason, a pressure load at the hydraulic braking pressure generating means is reduced. The hydraulic braking pressure generating means is associated with a braking pedal that is operated by a driver to generate an appropriate hydraulic braking pressure.

Thus, a reaction force acting from the braking pedal is reduced and an operating load is reduced too. The brake fluid drawn-up between the hydraulic braking pressure generating means and the holding means is delivered to the intermediate portion between the holding means and the wheel braking force generating means. In response to an increase of the brake fluid in this moment, the hydraulic braking pressure applied to the wheel braking force generating means is increased in reverse proportion to the decrease of the load at the hydraulic braking pressure generating means. This is owing to a pressure holding finction of the holding means. Using the above-described pressurization function makes it possible to regulate the hydraulic braking pressure applied to each wheel braking force generating means so as to eliminate the wheel behavior difference.

Furthermore, it is preferable to comprise holding means (90, 610) for holding an increased hydraulic braking pressure produced by the delivery means. The holding means (90, 610) in this case may hold a ratio of the hydraulic braking pressure (PL) in the piping system (A2) connecting a brake fluid outlet of the delivery means and the designated wheel braking force generating means to the hydraulic braking pressure (PU) produced from the hydraulic braking pressure generating means (3, 503).

Furthermore, the holding means (90, 610) may be a control valve disposed in the piping system and having a first control condition where the piping system is in a communicating condition and a second control condition where a differential pressure within a predetermined value is allowed between the hydraulic braking pressure supplied to the designated wheel braking force generating means and the hydraulic braking pressure produced from the hydraulic braking pressure generating means. In this case, a brake fluid outlet of the delivery means is located between the control valve of the piping system and the designated wheel braking force generating means, and the control valve is situated in the second control condition when the brake fluid is delivered from the delivery means.

Moreover, it is preferable to comprise the following features. A pressurization control valve (300, 300', 800, 800') is provided in the piping system for each wheel for opening the piping system during a non-regulated condition and a pressurized regulating condition and for closing the piping system during a depressurized regulating condition. A depressurization control valve (302, 302', 800, 802) is provided in a depressurizing passage connecting the piping system to the storage means for each wheel for opening the depressurizing passage during the depressurized regulating condition and for closing the depressurizing passage during the pressurized regulating condition and the non-regulated condition. And, hydraulic braking pressure regulating means (100, 600, ECU) regulates the hydraulic braking pressure applied to the designated wheel braking force generating means in accordance with a road surface limit (i.e., a frictional limit between a wheel and a given road surface, at an upper region of which no frictional force is obtained) during a braking condition of an associated wheel, so as to optimize the braking behavior of the wheel. In this case, the delivery means (101, 101', 611, 611') delivers the brake fluid to the piping system located between the pressurization control valve and the holding means.

With this arrangement, the hydraulic braking pressure regulating means can be utilized for quickly increasing the braking force of a non-regulated wheel, while the hydraulic braking pressure regulating means performing an anti-skid control or the like.

Preferably, both of the braking force control and the wheel behavior difference elimination control may be executed by using the same braking system. Furthermore, it is possible to execute the braking force control prior to the wheel behavior difference elimination control. Alternatively, it is possible to execute the wheel behavior difference elimination control prior to the braking force control. Moreover, it is possible to prohibit the wheel behavior difference elimination control unless the braking force control is being executed, so that the vehicle body behavior is stabilized only when a driver wants a strong braking operation.

The above-described wheels may comprise drive wheels only, or both of the drive wheels and the driven wheels. The automotive vehicle applied the above-described braking apparatus may be a two-wheeled vehicle, a three-wheeled vehicle, a four-wheeled vehicle or any other vehicle having many wheels exceeding four.

BRIEF DESCRIPTION OF THE DRAWINGS

The above and other objects, features and advantages of the present invention will become more apparent from the following detailed description which is to be read in conjunction with the accompanying drawings, in which:

FIG. 3 is a flowchart showing a braking force control processing performed by an electronic control unit ECU in accordance with the first embodiment of the present invention;

FIG. 4 is a timing chart showing variations of wheel speed, hydraulic braking pressure and vehicle deceleration G during a braking condition in accordance with the first embodiment of the present invention;

DESCRIPTION OF THE PREFERRED EMBODIMENTS

Preferred embodiments of the present invention will be explained hereinafter with reference to accompanied embodiments.

First embodiment

Figure 1:
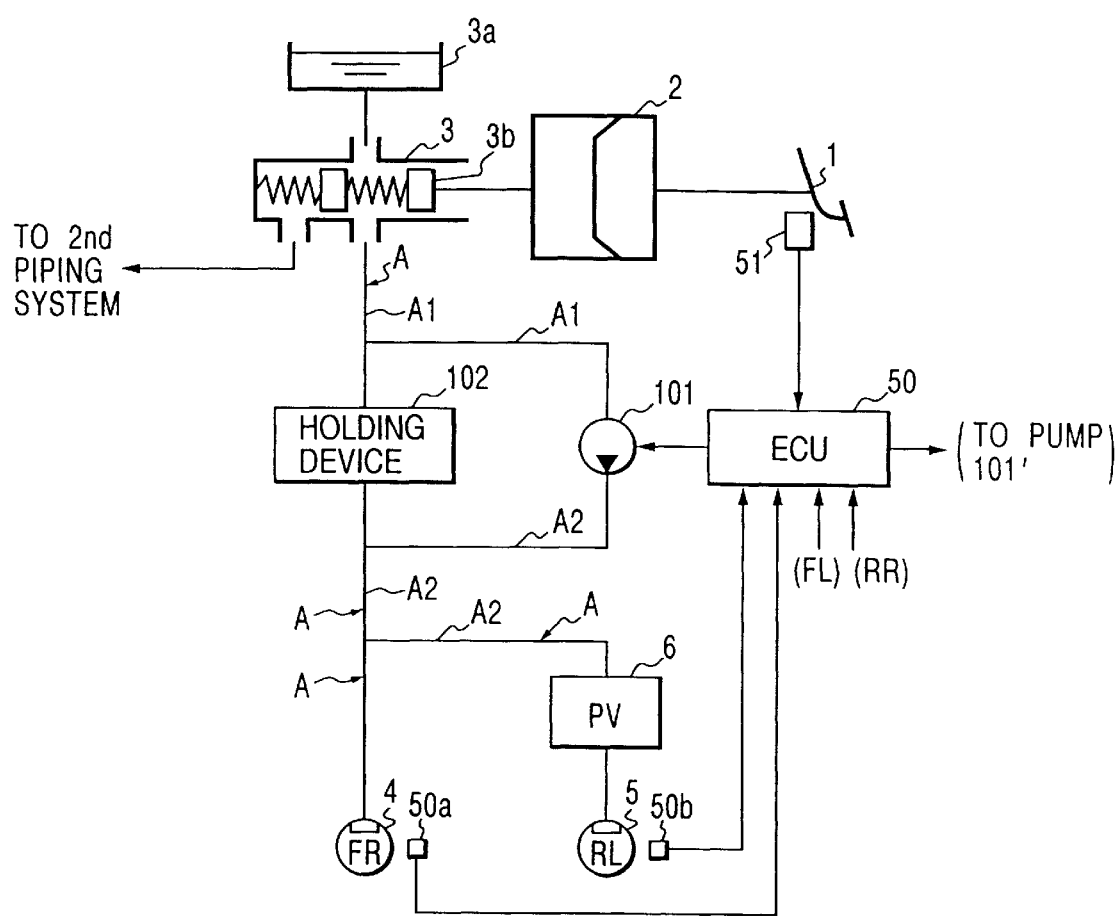
FIG. 1 is a schematic view showing a brake piping model for a combination of right front wheel FR and left rear wheel RL in accordance with a first embodiment of the present invention.
Figure 2:
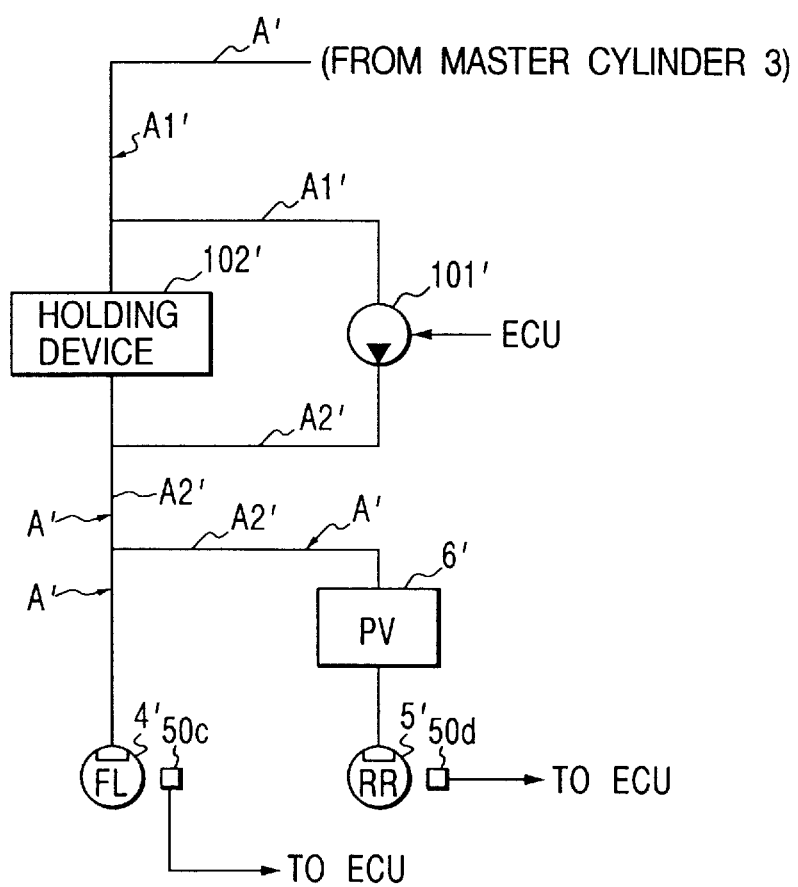
FIG. 2 is a schematic view showing a brake piping model for a combination of left front wheel FL and right rear wheel RR in accordance with the first embodiment of the present invention.

FIGS. 1 and 2 are views cooperatively showing a brake piping model in accordance with a first embodiment of the present invention. FIG. 1 shows an FR-RL brake piping system for a combination of a right front wheel and a left rear wheel. FIG. 2 shows an FL-RR brake piping system for a combination of a left front wheel and a right rear wheel. The first embodiment of the present invention shows a braking apparatus incorporated in a four-wheel, front-drive automotive vehicle comprising both of the FR-RL brake piping system and the FL-RR brake piping system.

In FIG. 1, a braking pedal 1 is depressed by a driver to apply a braking force to a vehicle. The braking pedal 1 is connected to a vacuum servo device 2. A depression force applied to the braking pedal 1 and a pedal stroke are both transmitted to this vacuum servo device 2. The vacuum servo device 2 has a plurality of chambers including at least first and second chambers. For example, the first chamber serves as an atmospheric chamber connected to the atmosphere while the second chamber serves as a vacuum chamber introducing a negative pressure. The negative pressure supplied to the second chamber can be introduced from an intake manifold of an internal combustion engine or from a vacuum pump. With a pressure difference between the atmospheric chamber and the vacuum chamber, the vacuum servo device 2 boosts the pedal depression force or the pedal stroke directly. The vacuum servo device 2 has a push rod or the like member used for transmitting the thus-boosted pedal depression force or pedal stroke to a master cylinder 3. The master cylinder 3 serves as hydraulic braking pressure generating means of the present invention. The push rod or the like member pushes a master piston 3b disposed in the master cylinder 3. The pushing operation by the push rod or the like member generates a master cylinder pressure PU. The master cylinder 3 is associated with a master reservoir 3a that serves as storage means of the present invention. The master reservoir 3a supplies brake fluid into the master cylinder 3 and stores surplus brake fluid discharged from the master cylinder 3.

The master cylinder pressure PU is transmitted via a holding device 102 to wheel cylinders 4 and 5 (that correspond to wheel braking force generating means of the present invention) for the right front wheel FR and the left rear wheel RL. For only the left rear wheel RL, a proportional control valve 6 is disposed in front of the wheel cylinder 5.

The proportional control valve 6 has a finction of reducing a referential pressure of the brake fluid in accordance with a predetermined reduction ratio and transmitting the depressurized brake fluid to its downstream portion, when the brake fluid flows in a forward direction (toward the wheel cylinder 5). With this depressurization function of the proportional control valve 6, the hydraulic braking pressure applied to the left rear wheel RL is reduced slightly compared with the hydraulic braking pressure applied to the right front wheel FR. This is effective to prevent the left rear wheel RL from being locked early than the right front wheel FR in a braking operation. Thus, the vehicle body behavior during the braking operation can be stabilized.

Furthermore, a pump 101 is disposed in parallel with the holding device 102. The pump 101, serving as delivery means of the present invention, draws brake fluid from a first piping passage A1 extending from the master cylinder 3 and delivers the drawn-up brake fluid to a second piping passage A2 communicating with the wheel cylinders 4 and 5.

Figure 5A:
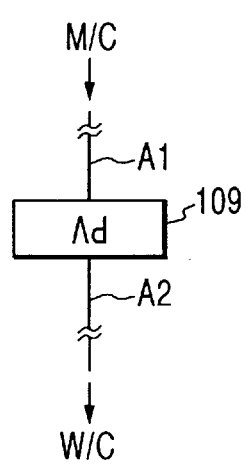
FIG. 5A is a view showing an arrangement of a proportional control valve in accordance with the first embodiment of the present invention.

The holding device 102 is, for example, constituted by a proportional control valve 109 reversely connected as shown in FIG. 5A.

Figure 5B:
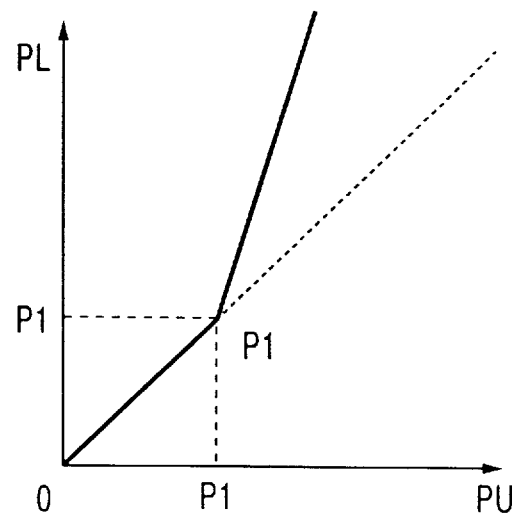
FIG. 5B is a graph showing a finction of the proportional control valve in accordance with the first embodiment of the present invention.

The proportional control valve 109 is similar to the proportional control valve 6 described above. Therefore, the proportional control valve 109 has a function of reducing a referential pressure of the brake fluid in accordance with a predetermined reduction ratio and transmitting the depressurized brake fluid to its downstream portion, when the brake fluid flows in a forward direction. In the arrangement of FIG. 5A, the proportional control valve 109 is reversely connected, so that the wheel cylinders 4 and 5 are both located at the referential pressure side of the proportional control valve 109. The master cylinder 3 is positioned at the downstream side of the proportional control valve 109. FIG. 5B shows a pressure relationship realized by the proportional control valve 109. In FIG. 5B, an ordinate represents referential pressure PL while an abscissa represents master cylinder pressure PU. When the master cylinder pressure PU is smaller than a crossover pressure P1, the master cylinder pressure PU is equal to the referential pressure PL.

The FL-RR brake piping system, as shown in FIG. 2, is basically identical with the above-described FR-RL brake piping system shown in FIG. 1. Any parts identical with those shown in FIG. 1 are denoted by the same reference numeral but affixed by "'" and not explained in the following description.

Conditions of the above-described pumps 101 and 101' are controlled by an electronic control unit ECU 50. A braking force control performed by the electronic control unit ECU 50 will be explained in greater detail with reference to a flowchart shown in FIG. 3.

The electronic control unit ECU 50 is connected to a stop switch 51 associated with the braking pedal 1 and detecting a depressing motion of the braking pedal 1. After the braking force control processing of FIG. 3 is started, the electronic control unit ECU 50 detects any depression of braking pedal 1 based on the signal obtained from the stop switch 51. The electronic control unit ECU 50 is further connected to wheel speed sensors 50a, 50b, 50c and 50d provided in respective wheels. Thus, the electronic control unit ECU 50 inputs wheel speeds of respective wheels through the wheel speed sensors 50a, 50b, 50c and 50d, and calculates a deceleration of each wheel based on the sensed speeds (S1000). Next, the electronic control unit ECU 50 judges whether the stop switch 51 is on or off, i.e., whether the braking pedal 1 is depressed or not, i.e., whether a braking operation is effected or not (S2000). If the braking pedal 1 is depressed ("YES" in S2000), the electronic control unit ECU 50 judges whether or not the deceleration of the wheel exceeds a predetermined value (S3000).

The judgement regarding the deceleration degree of the vehicle can be done based on a mean deceleration value among all wheels. It is also preferable to calculate the deceleration degree based on the data of a specific wheel that has the most-largest deceleration. Furthermore, it is preferable to neglect both of the largest and smallest deceleration values and use a mean value or either a larger one or a smaller one of the remaining data in the judgement of the deceleration degree of the vehicle.

When the deceleration degree exceeds the predetermined value ("YES" in S3000), the pressurization control processing for all wheels is started (S4000).

In this pressurization control for all wheels, pumps 101 and 101' are actuated to deliver brake fluid from the first piping passages A1 and A1' to the second piping passages A2 and A2', respectively. The proportional control valve 109 is located between the first piping passage A1 (A1') and the second piping passage A2 (A2'). Thus, as shown in Fig. 5B, the hydraulic pressure of the second piping passage A2 (A2') can be maintained at a level higher than the hydraulic pressure supplied from the master cylinder 3.

The thus-pressurized hydraulic braking pressure, having a pressure level higher than the hydraulic braking pressure supplied from the master cylinder 3, is applied directly to wheel cylinders 4 and 4' of front wheels FL and FR. Thus, a quickly-increased braking force is applied to the front wheels FL and FR. On the other hand, the hydraulic braking pressure is applied to the wheel cylinders 5 and 5' via proportional control valve 6 and 6'. Thus, a quickly-increased braking force is applied to the rear wheels RL and RR, although the magnitude of the braking force is slightly smaller than that for the front wheels FL and FR.

FIG. 4 is a timing chart showing a braking behavior. At a time t1, the deceleration exceeds a predetermined value. The pumps 101 and 101' are actuated immediately upon the deceleration exceeding this critical point. With the actuation of pumps 101 and 101', the brake fluid is delivered from the master cylinder 3 to wheel cylinders 4, 4', 5 and 5'. As indicated by solid lines, the hydraulic braking pressure for the wheel cylinders 4, 4', 5 and 5' starts increasing at a speed faster than that obtained by a driver's foot braking pedal operation (i.e., a manual braking operation). Thus, the deceleration G of the vehicle body is increased promptly. For comparison, dotted lines in the time chart show the behavior to be observed when the pumps 101 and 101' are not actuated.

Accordingly, when the driver wants to stop the vehicle immediately, the driver depresses the braking pedal 1 strongly. Thus, the deceleration of the vehicle may exceed the predetermined value. In this case, the electronic control unit ECU 50 increases the level of the hydraulic braking pressure applied to the wheel cylinders 4, 4', 5 and 5. This increased level is higher than that obtained by the driver's foot operation on braking pedal 1. Accordingly, the braking force can be increased at a speed exceeding the driver's braking operation without any further burden on the driver. The braking performance can be improved with a prompt increase of the braking force in response to a strong braking operation.

The above-described pressurization of the brake fluid is applied to all wheels. Thus, an excellent braking performance can be effected with an elimination of early locking of rear wheels.

Furthermore, the function of pumps 101 and 101' drawing the brake fluid from the master cylinder 3 decreases the level of the hydraulic braking pressure at the master cylinder 3. This is advantageous in that a reaction force caused against a driver's braking operation can be reduced. Thus, the braking operation can be simplified.

When the stop switch is not on (i.e., NO) at step S2000, or when the deceleration is smaller than the predetermined value (i.e., NO) at step S3000, the pressurization control processing for all wheels started at step S4000 is ceased (S5000). To prevent any hunting between the processing of step S4000 and the processing of step S5000, an adequate hysteresis is provided in the deceleration judgement in step S3000.

When the driver's depression on the braking pedal 1 is weakened, the master cylinder pressure PU is reduced. In this case, the secondary hydraulic braking pressure PL. is reduced through the proportional control valve 109 in accordance with the reduction of the master cylinder pressure PU. Thus, it becomes possible to obtain a braking finction reflecting the driver's intent. As understood from FIG. 5B, when the secondary hydraulic braking pressure PL is smaller than the crossover pressure P1, the first piping passage A1 is communicated with the second piping passage A2 through the proportional control valve 109. Thus, the secondary hydraulic braking pressure PL becomes equal to the master cylinder pressure PU, with no differential pressure between them. Furthermore, the secondary hydraulic braking pressure PL is regulated to have a pressure corresponding to the master cylinder pressure PU. When the master cylinder pressure PU is smaller than the crossover pressure P1, no differential pressure is given between the master cylinder pressure PU and the second hydraulic braking pressure PL. In short, the master cylinder pressure PU or the second hydraulic braking pressure PL is smaller than the crossover pressure P1, the master cylinder pressure PU and the second hydraulic braking pressure PL is in a one-to-one relationship in FIG. 5B.

Accordingly, the crossover pressure P1 of the proportional control valve 109 may be set higher to a certain degree. The braking pedal 1 is normally depressed strongly with a requirement to a large braking force, so that the master cylinder pressure PU is increased to an extremely high value. In this case, due to a higher setting of the crossover pressure P1, the secondary hydraulic braking pressure PL applied to the wheel cylinders 4, 4', 5 and 5' is not increased to the level exceeding the master cylinder pressure PU unless the master cylinder pressure PU reaches such an extremely high value.

Furthermore, when the crossover pressure P1 is set to 0, the brake fluid is always delivered forward by the pumps 101 and 101'. Thus, the secondary hydraulic braking pressure PL is always pressurized with respect to the master cylinder pressure PU. The secondary hydraulic braking pressure PL is always higher than the master cylinder pressure PU with an appropriate differential pressure maintained between them.

As described above, the first embodiment of the present invention provides an appropriate pressure difference in the region exceeding the crossover pressure P1. The brake fluid is not returned to the master cylinder 3 due to the provision of the differential pressure even if the pumps 101 and 101' deliver the brake fluid, unless the delivered hydraulic pressure exceeds the differential pressure. When the braking operation is finished, the processing of step S5000 is executed. After that, the pressure of master cylinder 3 is reduced, the pumps 101 and 101' are stopped, and the differential pressure is eliminated finally. Thus, the returning flow of the brake fluid to the master cylinder 3 is done smoothly.

When the brake fluid flows in an opposite direction with respect to the proportional valve 109, the proportional valve 109 does not act to reduce the pressure level of the brake fluid. Thus, the hydraulic braking pressure transmitted to its downstream side is identical with the referential pressure. According to the above-described first embodiment of the present invention, the first piping passage A1 is the referential pressure side of the proportional control valve 109, while the second piping passage A2 is the downstream side of the proportional control valve 109. Thus, the brake fluid flows from the master cylinder 3 to the wheel cylinders 4, 4', 5 and 5'. Furthermore, according to the first embodiment, the proportional control valve 109 is reversely connected as shown in FIG. 5A. This arrangement is advantageous in that the master cylinder pressure PU is surely supplied to the wheel cylinders 4, 4', 5 and 5' even if the pumps 101 and 101' fail to increase the master cylinder pressure PU up to the level equivalent to the secondary hydraulic braking pressure PL.

It is preferable to use a well-known load-sensing proportioning valve for the proportional control valve 109 of the present invention. In this case, it becomes possible to adjust the increase rate of the hydraulic braking pressure adequately in accordance with a vehicle weight variable in proportion to a loading weight or the like.

The processing performed at the step S1000 corresponds to the functions of braking condition detecting means and deceleration detecting means of the present invention. The processing performed at the steps S2000, S3000 and S4000 corresponds to the function of braking force control means of the present invention.

Second embodiment

The holding devices 102 and 102' can be replaced by a combination of a master cut valve 110 (equivalent to the control valve) and a depression-increase valve 111. The same effect is obtained.

Figure 6A:
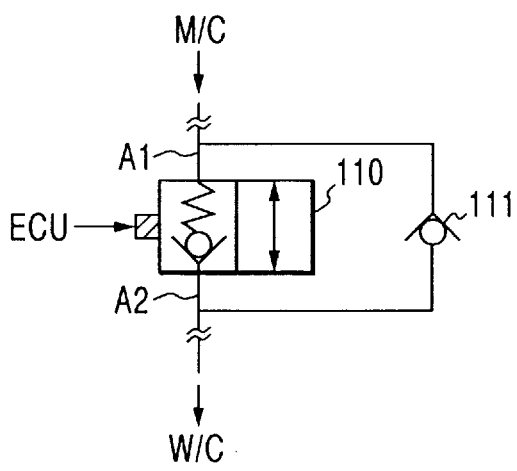
FIG. 6A is a view showing an arrangement of a master cut valve in accordance with a second embodiment of the present invention.
Figure 6B:
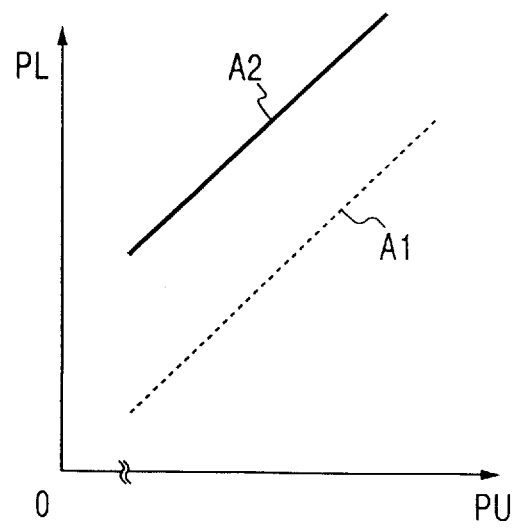
FIG. 6B is a graph showing a finction in accordance with the second embodiment of the present invention.

The master cut valve 110 comprises a port with a differential pressure valve and a port realizing a communicating condition. In an ordinary condition, the master cut valve 110 is in the communicating condition (that corresponds to the first control condition). When an actuation signal is given from the electronic control unit ECU 50, the master cut valve 110 is switched to the other state acting as the differential pressure valve (that corresponds to the second control condition). A differential pressure PRV can be provided between the first piping passage A1 and the second piping passage A2, so that the hydraulic pressure of the second piping passage A2 is always higher than that of the first piping passage A1 as shown in FIG. 6B.

Figure 7:
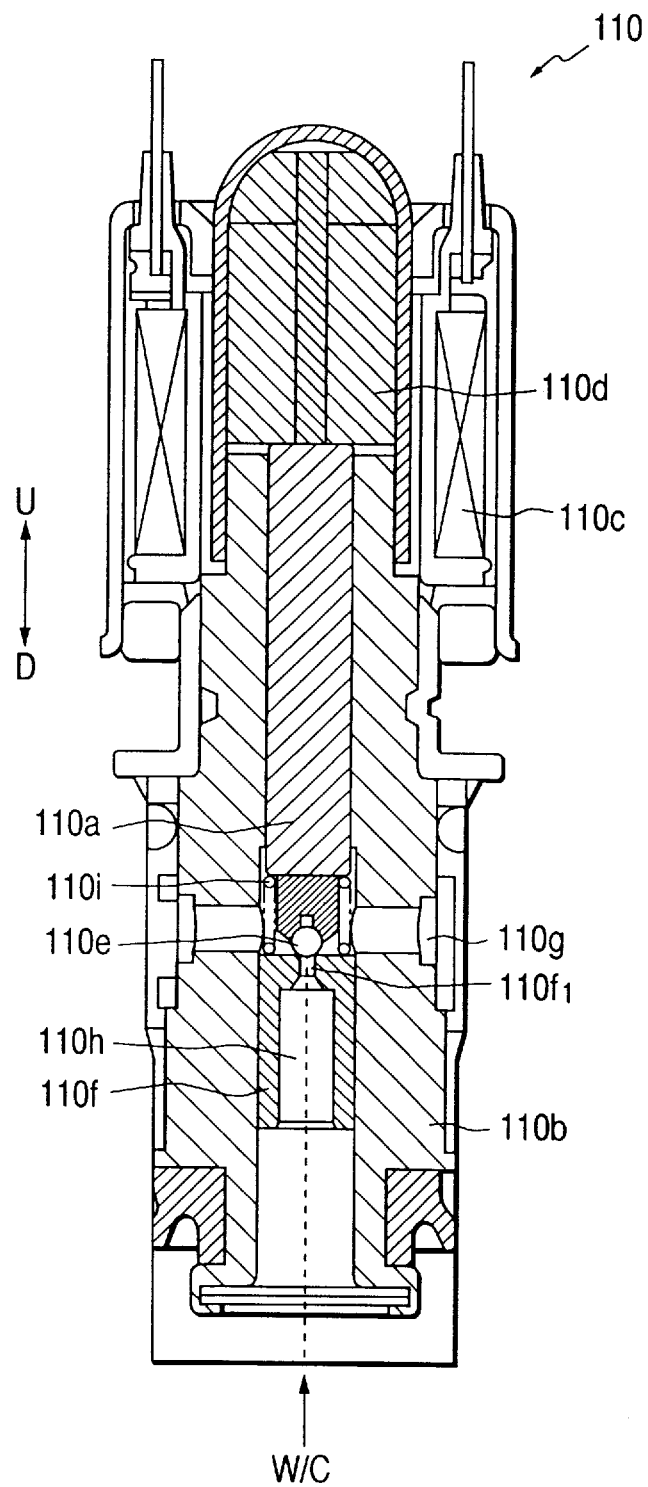
FIG. 7 is an enlarged view showing a detailed arrangement of the master cut valve in accordance with the second embodiment of the present invention.

An arrangement of the master cut valve 110 is shown in greater detail in FIG. 7. A shaft 110a is slidable in an U-and-D direction. The shaft 110a is inserted in a guide 110b. A plunger 110d is connected to the rear end of shaft 110a and is actuated by an energizing force of coil 110c. The plunger 110d shifts the shaft 110a. A ball 110e is provided at the front end of the shaft 110a. The ball 110e opens or closes a piping passage "A." A sheet 110f has a small-diameter opening 110f1. The ball 110e closes the opening 110f1. A spring 110i urges the shaft 110a in the direction of arrow U. The master cylinder 3 and wheel cylinders 4, 4', 5 and 5' are connected by an oil passage (indicated by a dotted line) passing through a master cylinder communication hole 110g, a clearance defined between ball 110e and sheet 110f, and a wheel cylinder communication hole 110h communicating with the opening 110f1.

In this master cut valve 110, the shaft 110a is usually urged by a resilient force of the spring 110i so as to shift in the direction of arrow U. In this ordinary condition, the oil passage is opened. When the coil 110c is energized, the shaft 110a shifts in the direction of arrow D against the resilient force of spring 110i until the ball 110e closes the opening 110f1. Thus, the oil passage is closed.

The depression-increase valve 111, disposed in parallel with the master cut valve 110, permits the brake fluid to flow from master cylinder 3 into wheel cylinders 4, 4', 5 and 5' in response to a further depression of the braking pedal 1 by the driver.

With this arrangement, when the pumps 101 and 101' increase the secondary hydraulic pressure PL with respect to the master cylinder pressure PU, the secondary hydraulic pressure PL is maintained unless the pressurized level exceeds the differential pressure PRV. Furthermore, the master cut valve 110 may be accidentally locked at the valve position serving as the differential pressure valve. The pumps 101 and 101' (that serve as delivery means of the present invention) may malfunction in their operations. In this respect, providing the depression-increase valve 111 is advantageous in that the master cylinder pressure PU can be surely supplied to the wheel cylinders 4, 4', 5 and 5' in such emergent cases.

Increasing the differential pressure PRV to a sufficiently large value is equivalent to replacing the master cut valve 110 with an ordinary cut valve. Accordingly, the master cut valve 110 can be constituted by a two-way valve having open and close positions like later-described switching valves 601 and 601'. When the braking operation is finished, the processing of step S5000 is performed. Accordingly, even if the brake fluid is completely cut, the master cut valve 110 is situated in the communicating condition. Thus, the brake fluid is returned to the master cylinder 3 smoothly.

Third embodiment

Figure 8:
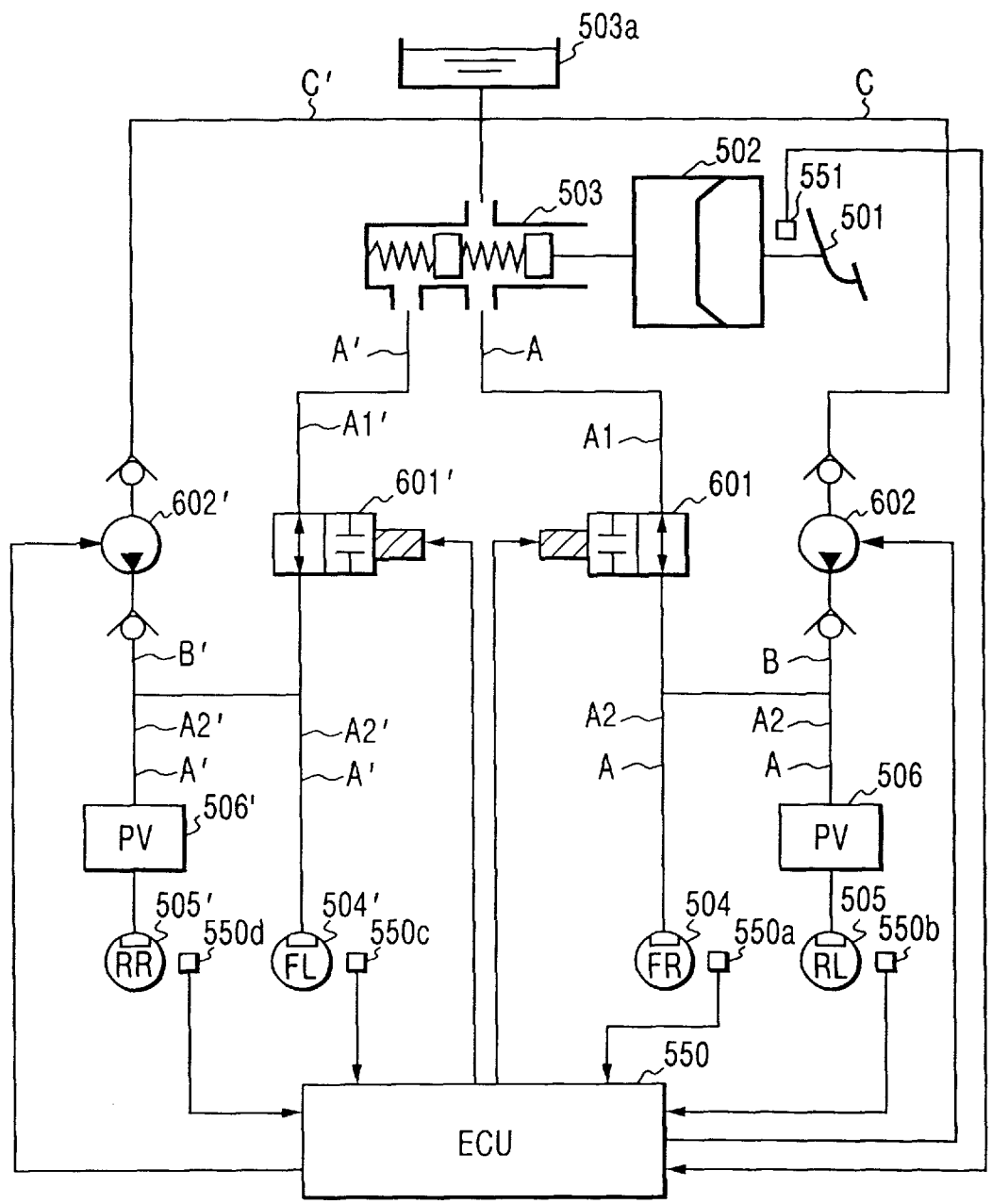
FIG. 8 is a brake piping model for all wheels in accordance with a third embodiment of the present invention.

FIG. 8 is a schematic diagram showing a brake piping model in accordance with a third embodiment of the present invention. The third embodiment discloses a braking apparatus incorporated into a four-wheel front-drive automotive vehicle comprising an FR-RL brake piping system for a combination of a right front wheel FR and a left rear wheel RL and an FL-RR brake piping system for a combination of a left front wheel FL and a right rear wheel RR.

The FL-RR brake piping system is basically identical with the FR-RL brake piping system. Any parts identical with those of the FR-RL piping system are denoted by the same reference numeral but affixed by "'" hereinafter.

A braking pedal 501, a vacuum servo device 502, a master cylinder 503, a master reservoir 503a, proportional control valves 506, 506', wheel cylinders 504, 504', 505, 505', wheel speed sensors 550a, 550b, 550c, 550d and a stop switch 551 are substantially identical with the braking pedal 1, the vacuum servo device 2, the master cylinder 3, the master reservoir 3a, the proportional control valve 5, the wheel cylinders 4, 4', 5, 5', the wheel speed sensors 50a, 50b, 50c, 50d and the stop switch 51 explained in the first and second embodiments. Thus, these components are not explained in the following description. First of all, the third embodiment is different from the first and second embodiments in that the piping passage "A" comprises switching valves 601 and 601' serving as the holding means of the present invention. Each of the switching valves 601 and 601' comprises a port realizing a communicating condition and a port realizing a closed condition. In an ordinary condition, the switching valves 601 and 601' are in the communicating condition. When an actuation signal is given from an electronic control unit ECU 550, the switching valves 601 and 601' are switched to the closed condition.

Second, the third embodiment is different from the first and second embodiments in that pumps 602 and 602' are not disposed in parallel with the switching valves 601 and 601'. The pump 602 draws up the brake fluid from the master reservoir 503a directly and delivers the drawn up brake fluid to an intermediate point between the switching valve 601 and the wheel cylinders 504 and 505. The pump 602', draws up the brake fluid from the master reservoir 503a and delivers the drawn up brake fluid to an intermediate point between the switching valve 601' and the wheel cylinders 504' and 505'.

A braking force control processing performed by the electronic control unit ECU 550 in accordance with the third embodiment of the present invention is basically identical with the braking force control processing shown in FIG. 3, although the pressurization control processing for all wheels is performed differently in the step S4000.

More specifically, in the step S4000, the switching valves 601 and 601' are switched to the closed condition. Then, the pumps 602 and 602' are actuated to draw up the brake fluid from the master reservoir 503a and deliver the sucked up brake fluid to the second piping passages A2 and A2'. Due to the closing condition of switching valve 601, the first piping passage A1 is not communicated with the second piping passage A2. In the same manner, due to the closing condition of switching valve 601', the first piping passage A1' is not communicated with the second piping passage A2'. Thus, the hydraulic pressure in the second piping passages A2, A2' (i.e., the hydraulic pressure supplied to wheel cylinders 504, 504', 505, 505') is increased to a level higher than the hydraulic pressure in the first piping passage A1, A1' (i.e., master cylinder 3).

The thus-pressurized hydraulic braking pressure, having a pressure level higher than the hydraulic braking pressure supplied from the master cylinder 503, is applied directly to wheel cylinders 504 and 504' of front wheels FL and FR. Thus, a quickly-increased braking force is applied to the front wheels FL and FR. In the same manner, the hydraulic braking pressure is applied to the wheel cylinders 505 and 505' via proportional control valve 506 and 506'. Thus, a quickly-increased braking force is applied to the rear wheels RL and RR, too.

When the judgement result becomes "NO" in either the step S2000 or the step S3000, the pumps 602 and 602' are deactivated at step S5000. And, the switching valves 601 and 601' are returned to the communicating condition.

Accordingly, in the same manner as in the first and second embodiments, the braking force can be increased at a speed exceeding the driver's braking operation without any further burden imposed on the driver. The braking performance can be improved with a prompt increase of the braking force in response to a strong braking operation. Furthermore, the above-described pressurization of the brake fluid is applied to all wheels. Thus, an excellent braking performance can be effected with an elimination of early locking of rear wheels.

Furthermore, the function of pumps 602 and 602' sucking-up the brake fluid from the master reservoir 503 is advantageous in that the master cylinder 503 is free from the lack of brake fluid.

The above-described embodiments are incorporated in the four-wheel, front drive vehicle characterized by an X piping arrangement consisting of the FR-RL brake piping system and the FL-RR brake piping system. However, the present invention can be applied to a rear drive vehicle, or a two-wheel vehicle, any other dual braking system (e.g., a front-and-rear braking system), or an independent brake piping system dedicated to each wheel.

Regarding the detection of deceleration, the above-described embodiments rely on the detection of wheel deceleration. However, it is preferable to use a deceleration sensor (i.e., G sensor) to detect the vehicle deceleration directly. Furthermore, an anti-skid control system may be incorporated in a braking system to effect an anti-skid control, as later described with reference to FIGS. 10 and 11. In such an anti-skid control system, a vehicle speed is estimated from the wheel speeds. Thus, the estimated vehicle speed can be used to estimate the vehicle deceleration too.

According to the above-described embodiments, the pressurization of the brake fluid is applied to all wheels. Needless to say, this pressurization control can be applied only to front wheels or rear wheels. Furthermore, among a plurality of wheels to be controlled, it is preferable to differentiate an increased degree of the braking force applied to each wheel.

Figure 9:
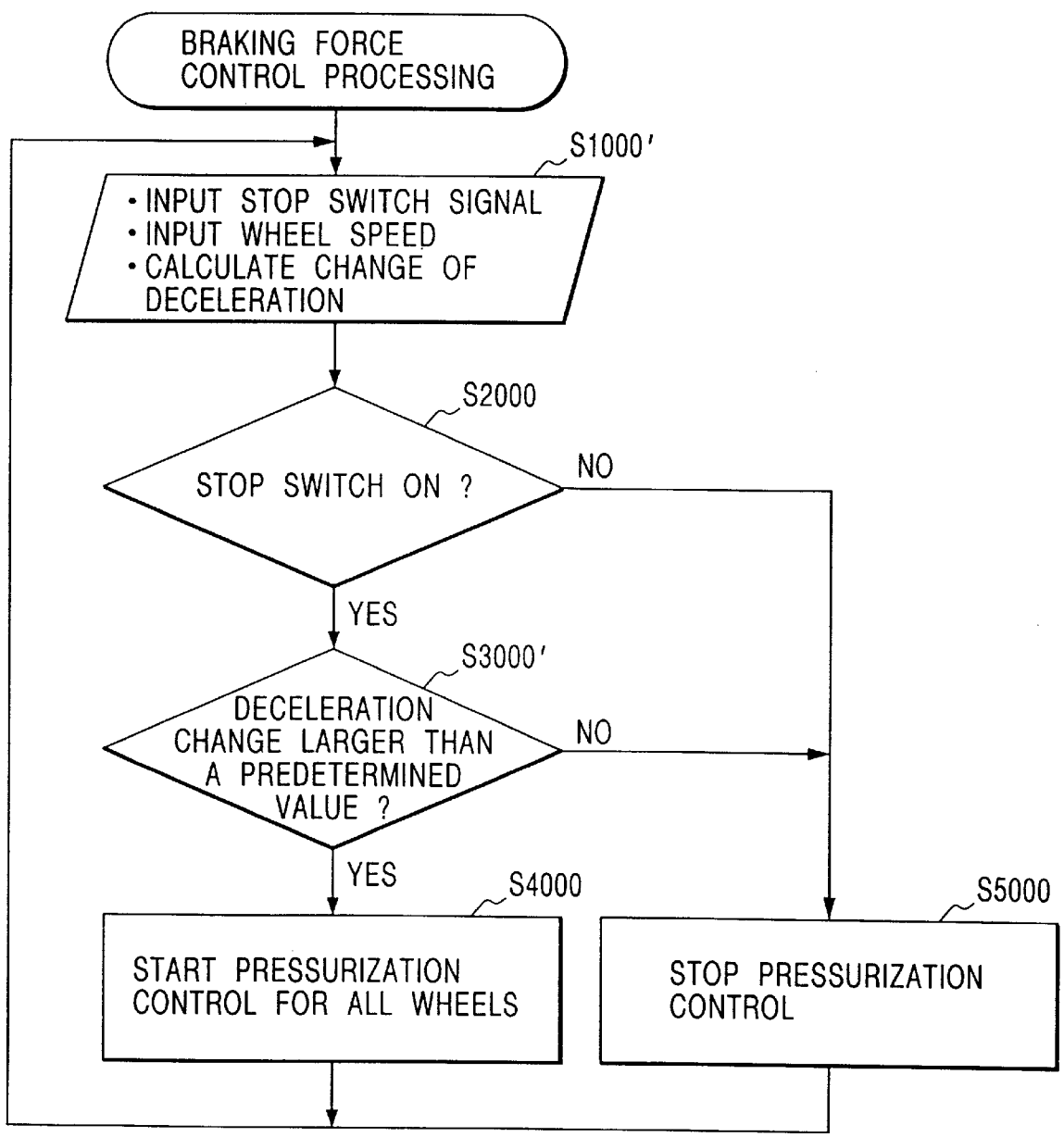
FIG. 9 is a flowchart showing a modified braking force control processing performed by the electronic control unit ECU in accordance with the first embodiment of the present invention.

Furthermore, it is preferable to detect a change amount of the deceleration as shown in FIG. 9. In this case, the processing of steps S1000 and S3000 of FIG. 3 is replaced by steps 1000' and 3000'. More specifically, the electronic control unit ECU 50 calculates a change of the deceleration in step S1000', instead of calculating the deceleration itself. Then, at step S3000', the electronic control unit ECU 50 judges whether the calculated deceleration change exceeds a predetermined value. With this arrangement, a driver's demand for an immediate stop can be sensed more accurately. Thus, the braking force can be increased at an excellent speed exceeding the driver's braking operation without any further burden imposed on the driver.

Fourth embodiment

Figure 10:
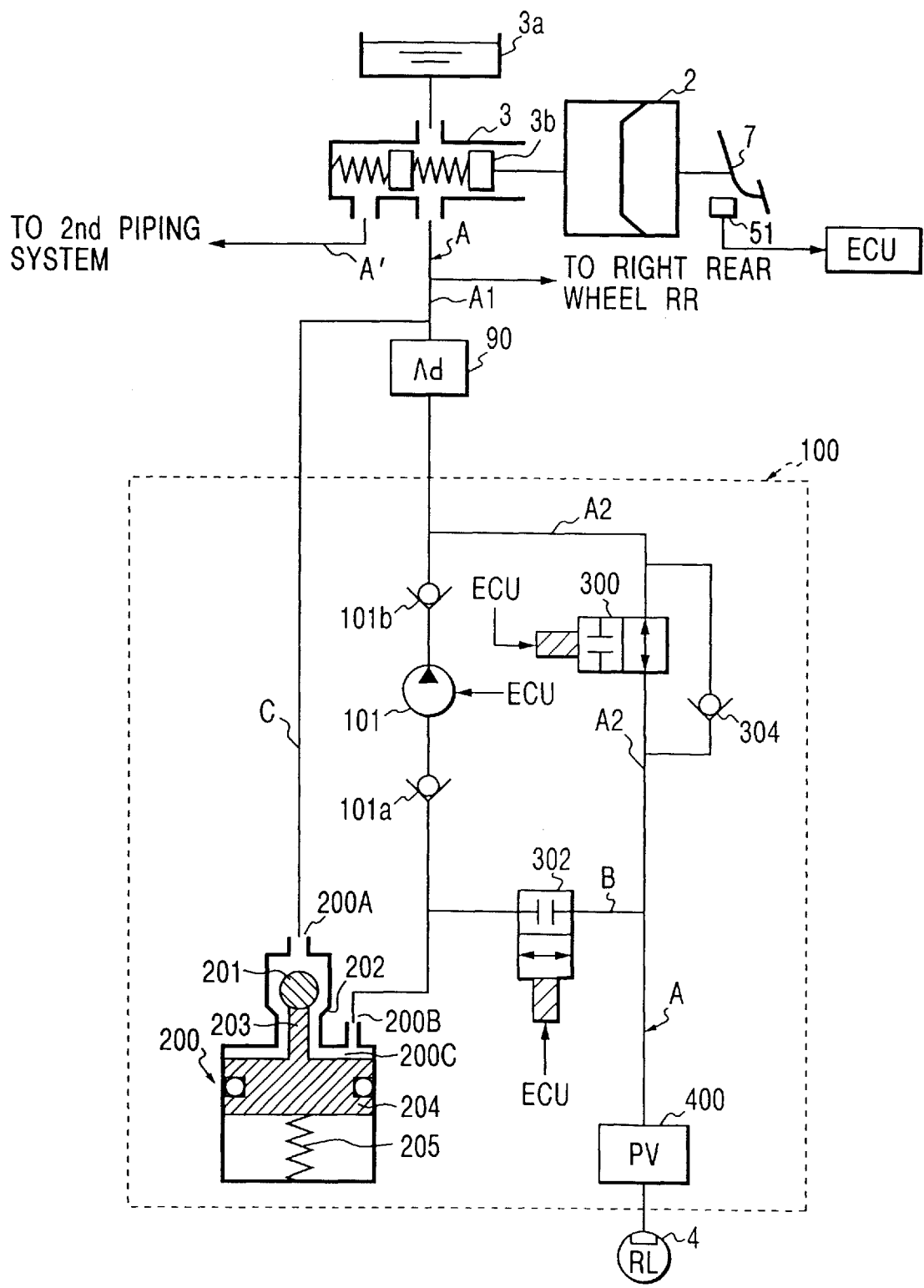
FIG. 10 is a schematic view showing a brake piping model for rear wheels in accordance with a fourth embodiment of the present invention.
Figure 11:
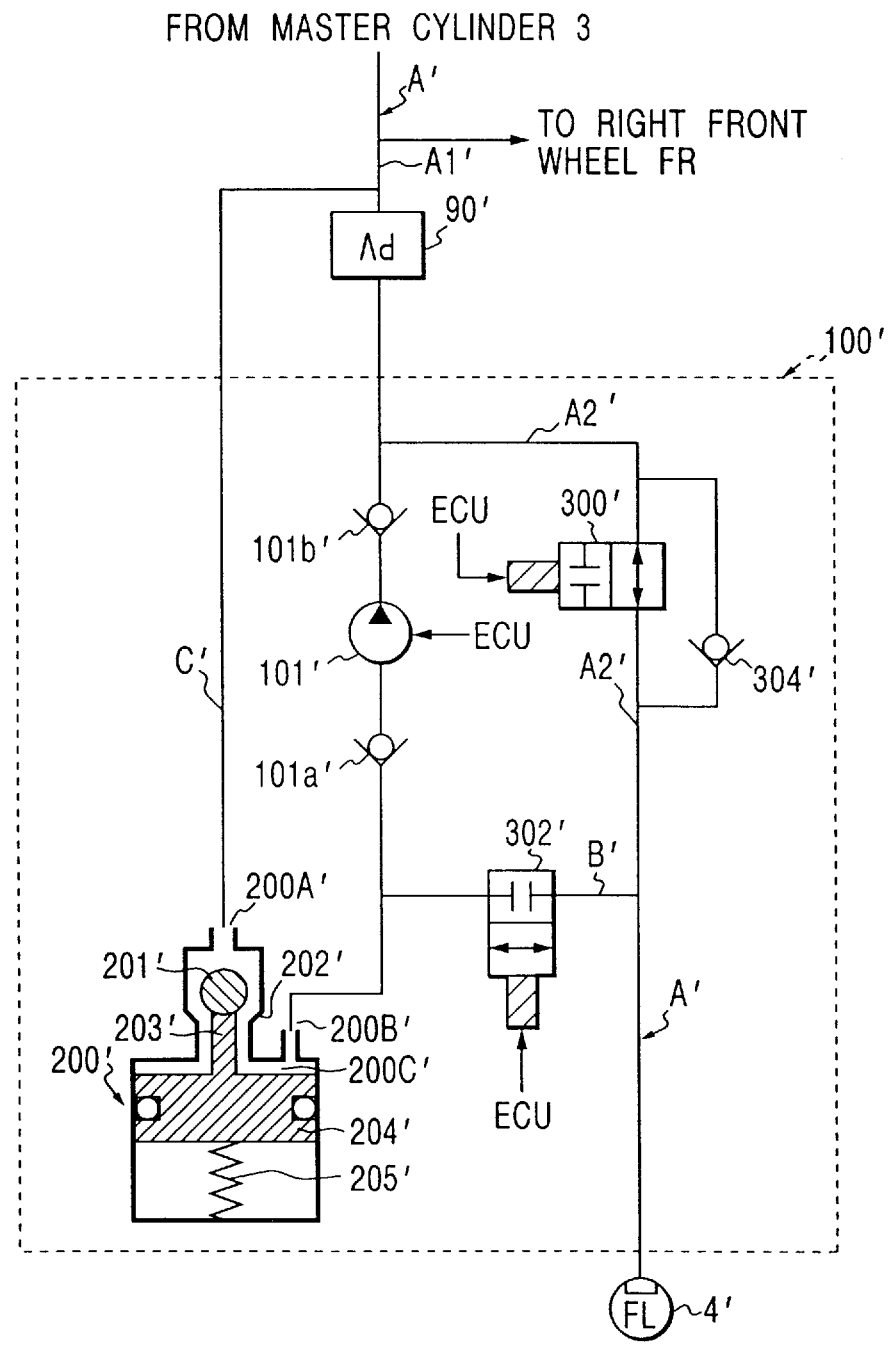
FIG. 11 is a schematic view showing a brake piping model for front wheels in accordance with the fourth embodiment of the present invention.

FIGS. 10 and 11 are views cooperatively showing a brake piping model in accordance with a fourth embodiment of the present invention. FIG. 10 shows a rear brake piping system for right and left rear wheels. FIG. 11 shows a front brake piping system for right and left front wheels. The forth embodiment of the present invention shows a braking apparatus incorporated in a four-wheel, front-drive automotive vehicle comprising both of an FL-FR brake piping system and an RL-RR brake piping system.

In FIG. 10, a braking pedal 1 is depressed by a driver to apply a braking force to a vehicle and is connected to a vacuum servo device 2. A depression force applied to the braking pedal 1 and a pedal stroke are transmitted to this vacuum servo device 2. The vacuum servo device 2 has a plurality of chambers including at least first and second chambers. For example, the first chamber serves as an atmospheric chamber while the second chamber serves as a vacuum chamber. A negative pressure is supplied to the second chamber from an intake manifold of an internal combustion engine or from a vacuum pump. With a pressure difference between the atmospheric chamber and the vacuum chamber, the vacuum servo device 2 boosts the pedal depression force or the pedal stroke directly. The vacuum servo device 2 has a push rod or the like member used for transmitting the thus-boosted pedal depression force or pedal stroke to a master cylinder 3 that serves as the hydraulic braking pressure generating means of the present invention. The push rod or the like member pushes a master piston 3b disposed in the master cylinder 3. This pushing operation generates a master cylinder pressure PU. The master cylinder 3 is associated with a master reservoir 3a that supplies brake fluid into the master cylinder 3 and stores surplus brake fluid of the master cylinder 3.

The master cylinder pressure PU is transmitted via a proportional control valve 90 (corresponding to the holding means of the present invention) and an anti-slid system 100 to a wheel cylinder 4 (corresponding to the wheel braking force generating means of the present invention) of the left rear wheel RL. A brake piping arrangement for right rear wheel RR is the same as that for the left rear wheel RL. Thus, the brake piping arrangement for the left rear wheel RL will be explained chiefly hereinafter, omitting the explanation for the right rear wheel RR.

Figure 15:
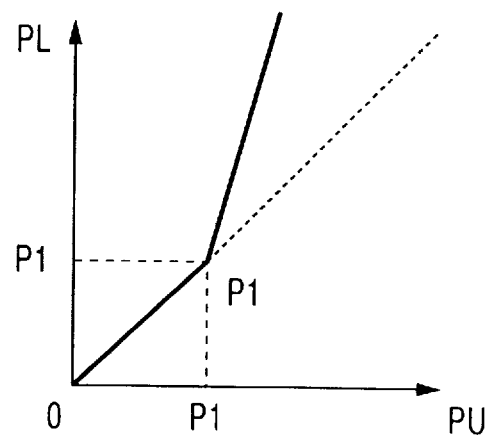
FIG. 15 is a graph showing a function of a proportional control valve in accordance with the fourth embodiment of the present invention.

The proportional control valve 90 has a function of reducing a referential pressure of the brake fluid in accordance with a predetermined reduction ratio and transmitting the depressurized brake fluid to its downstream portion, when the brake fluid flows in a forward direction. In the arrangement of FIG. 10, the proportional control valve 90 is reversely connected. Thus, the wheel cylinder 4 is located at the referential pressure side of the proportional control valve 90. The master cylinder 3 is positioned at the downstream side of the proportional control valve 90. FIG. 15 shows a pressure relationship realized by the proportional control valve 90. In FIG. 15, an ordinate represents referential pressure PL while an abscissa represents master cylinder pressure PU. When the master cylinder pressure PU is smaller than a crossover pressure P1, the master cylinder pressure PU is identical with the referential pressure PL.

The anti-skid system 100 comprises the following arrangement. A piping passage "A" is part of the piping system connected to the reversely connected proportional control valve 90. A pressurization control valve 300 is provided in a second piping passage "A2" of the piping system. The pressurization control valve 300 increases the level of a hydraulic braking pressure supplied to the wheel cylinder 4.

The pressurization control valve 300 is a two-way valve capable of controlling its open/close condition in response to a control signal supplied from an electronic control unit ECU for the anti-skid system 100. When this two-way valve is in an opened condition, the master cylinder pressure PU is supplied to the wheel cylinder 4 via the proportional control valve 90 or a hydraulic braking pressure due to the delivery by a pump 101 is supplied to the wheel cylinder 4. In a normal braking condition where the anti-skid control is not performed, the pressurization control valve 300 is always in the opened condition. In a depressurization control condition or a holding control condition during the anti-skid control condition, the pressurization control valve 300 is in a closed condition. A safety valve 304 is provided in parallel with the pressurization control valve 300. The safety valve 304 has a function of discharging surplus hydraulic braking pressure from the wheel cylinder 4. The anti-skid system 100 and the electronic control unit ECU cooperatively act as the hydraulic braking pressure regulating means of the present invention. The hydraulic braking pressure regulating means regulates the hydraulic braking pressure applied to a designated wheel cylinder in accordance with a road surface limit (i.e., a frictional limit between a wheel and a given road surface, at an upper region of which no frictional force is obtained) during a braking condition of the wheel, so as to optimize the braking behavior of the wheel. A reservoir 200 (corresponding to the storage means of the present invention) is provided outside the piping system. A second reservoir hole 200B of the reservoir 200 is connected to the piping passage "A" via a piping passage "B" at an intermediate portion between the pressurization control valve 300 and the wheel cylinder 4. A depressurization control valve 302 is disposed in the piping passage "B." The depressurization control valve 302 is a two-way valve capable of controlling its open/close condition in response to a control signal supplied from the electronic control unit ECU for the anti-skid system 100. The depressurization control valve 302 is always in a closed condition in the normal braking condition. During the anti-skid control, the depressurization control valve 302 is in an opened condition for a depressurization control and in the closed condition for a holding control.

The reservoir 200 has a first reservoir hole 200A that receives brake fluid from a piping passage "C" having a pressure level identical with the master cylinder pressure PU. A ball valve 201 is disposed inside the first reservoir hole 200A of the reservoir 200. A rod 203 is disposed beneath the ball valve 201. The rod 203 is movable within a predetermined stroke to shift the ball valve 201 in an up-and-down direction. A reservoir chamber 200C accommodates a piston 204 integral with the rod 203 and slidable together with this rod 203. The piston 204 shifts downward when brake fluid flows into the reservoir 200 from the first reservoir hole 200A and the second reservoir hole 200A. Thus, the brake fluid is stored in the reservoir chamber 200C.

In response to the downward shift movement of piston 204 during the storage of brake fluid, the rod 203 shifts downward correspondingly. Thus, the ball valve 201 is brought into contact with a valve seat 202. In other words, when the reservoir chamber 200C stores brake fluid by an amount equivalent to the full stroke of rod 203, the ball valve 201 and the valve seat 202 cooperatively interrupt the flow of brake fluid in the region from a suction side of pump 101 to the first piping passage A1 via the piping passage "C".

The pump 101 (corresponding to the delivery means of the present invention) is interposed between safety valves 101a and 101b. The pump 101 draws the brake fluid between the depressurization control valve 302 and the reservoir hole 200B, and delivers the drawn up brake fluid to the second piping passage A2 at an intermediate portion between the proportional control valve 90 and the pressurization control valve 300.

A proportional control valve 400 is disposed in front of the wheel cylinder 4. The proportional control valve 400 is substantially the same as the above-described proportional control valve 90. That is, the proportional control valve 400 has a function of reducing a referential pressure of the brake fluid in accordance with a predetermined reduction ratio and transmitting the depressurized brake fluid to its downstream portion, when the brake fluid flows in a forward direction. With this depressurization function of the proportional control valve 400, the hydraulic braking pressure applied to the rear wheel is reduced slightly compared with the hydraulic braking pressure applied to the front wheel. This is effective to prevent the rear wheel from being locked early than the front wheel in a braking operation. Thus, the vehicle body behavior during the braking operation can be stabilized. As shown in FIG. 11, the front wheel braking system has no proportional control valve corresponding to the proportional control valve 400.

Regarding the front wheel braking system, its arrangement is substantially the same as that of the rear wheel braking system except that no proportional control valve is provided in front of the wheel cylinder 4', as shown in FIG. 11. Accordingly, any parts identical with those shown in FIG. 10 are denoted by the same reference numeral but affixed by "'" and not explained in the following description.

The above-described pressurization control valves 300, 300', depressurization control valves 302, 302' and pumps 101, 101' are controlled by the electronic control unit ECU for the anti-skid system 100.

A brake control performed by the electronic control unit ECU for the anti-skid system 100 will be explained in greater detail with reference to a flowchart shown in FIG. 12. This control processing is performed for each of four wheels. In the following explanation, the processing for the left front wheel FL is chiefly explained, although the same processing is applied to other wheel.

The electronic control unit ECU is connected to a stop switch 51 associated with the braking pedal 1. After the brake control processing is started, the electronic control unit ECU detects a presence of a depression of braking pedal 1 based on the signal obtained from the stop switch 51. The electronic control unit ECU is further connected to wheel speed sensors provided in respective wheels (refer to FIGS. 1 and 2). Thus, the electronic control unit ECU inputs wheel speeds of respective wheels through these wheel speed sensors (S6000). Next, the electronic control unit ECU judges whether the stop switch 51 is on or off, i.e., whether the braking pedal 1 is depressed or not, i.e., whether a braking operation is effected or not (S7000). If the braking pedal 1 is depressed ("YES" in S7000), the electronic control unit ECU judges whether or not a speed difference between the left front wheel FL and any other wheel exceeds a predetermined value. More specifically, speed differences are obtained by subtracting each speed of other three wheels by the speed of the own wheel (i.e., left front wheel FL). Among three subtraction values thus obtained, it is checked whether or not any one of these three subtraction values exceeds the predetermined value (S8000).

When any one of these three subtraction values exceeds the predetermined value (i.e., "YES" in S8000), a speed difference elimination processing is initiated (S9000).

The speed difference elimination processing is applied to any wheels when their speed difference exceeds the predetermined value, provided that these wheels are not subjected to the anti-skid control. The pumps 101, 101' corresponding to the designated wheels are actuated. The brake fluid is delivered to the second piping passages A2, A2' via piping passages C, C' and reservoirs 200, 200'. The proportional control valves 90, 90' are disposed between the second piping passages A2, A2' and the first piping passages A1, A1'. The proportional control valves 90 and 90' maintain the pressure level of the second piping passages A2 and A2' to be higher than that of the master cylinder 3.

Figure 13:
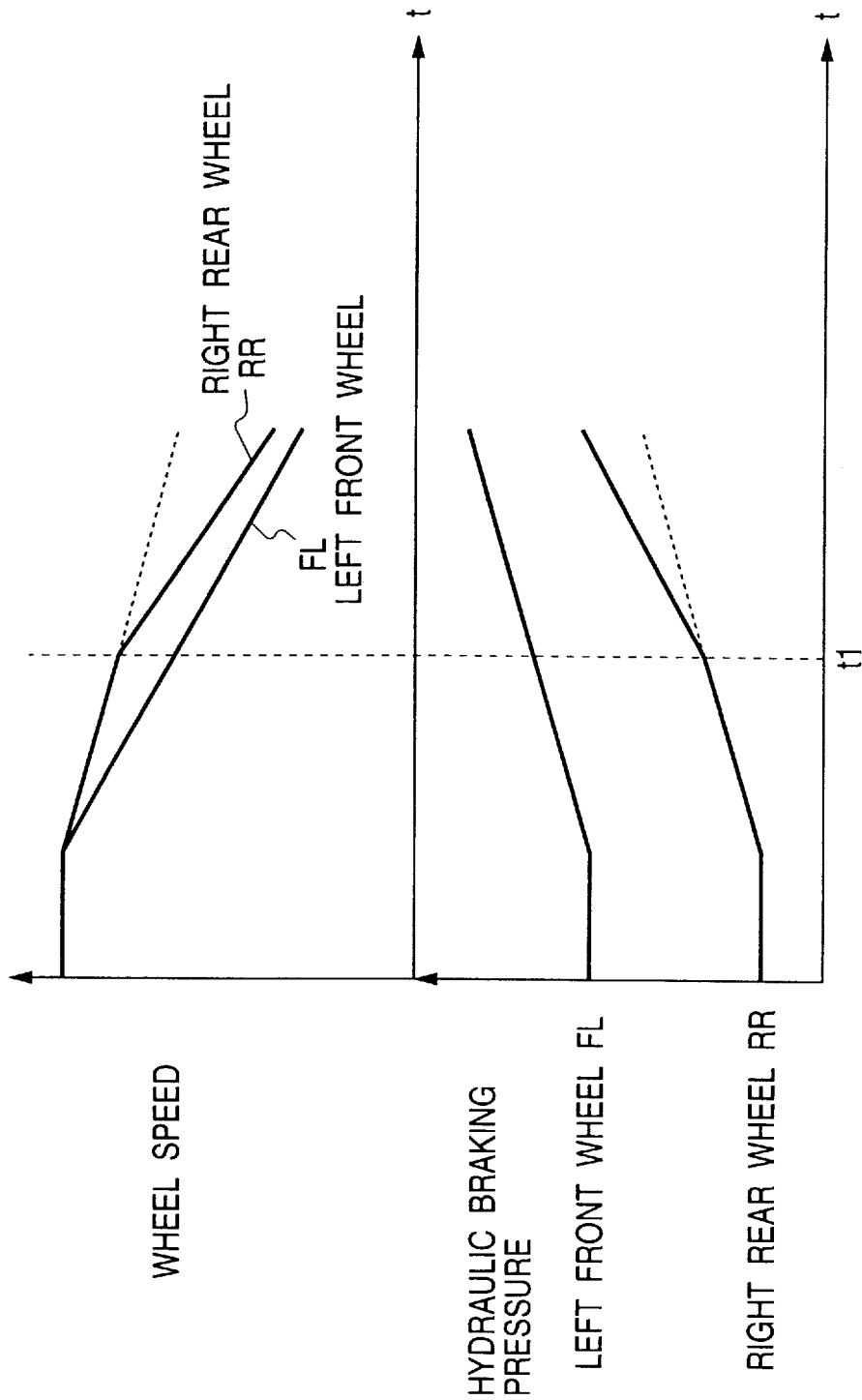
FIG. 13 is a timing chart showing variations of wheel speed and hydraulic braking pressure during a braking condition in accordance with the fourth embodiment of the present invention.
Figure 14:
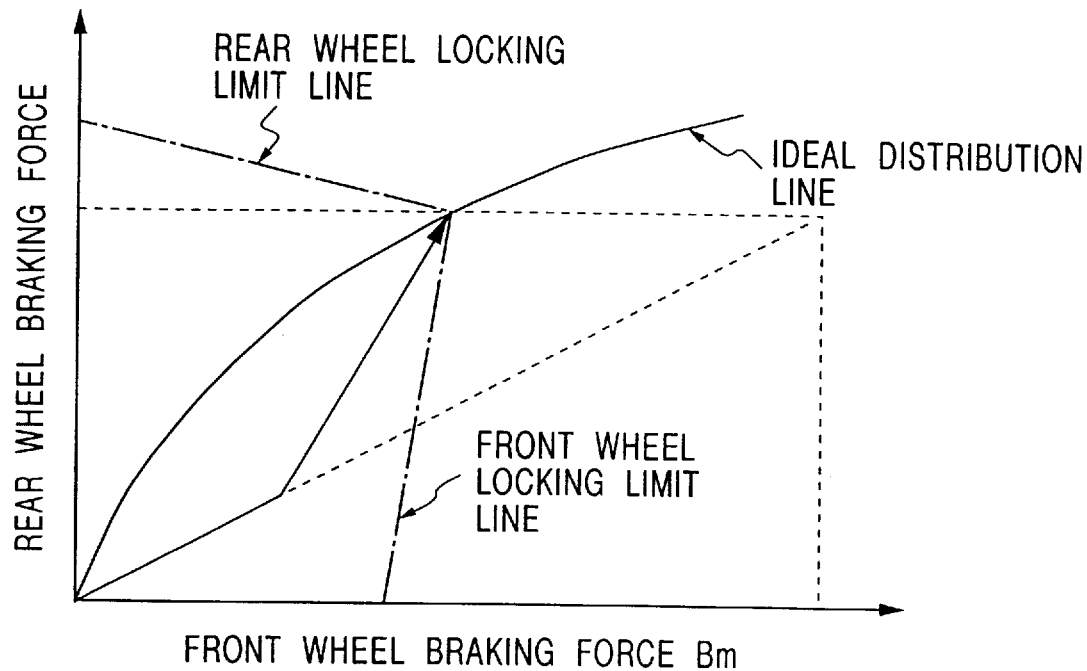
FIG. 14 is a view showing variations of braking forces applied to front and rear wheels during a braking operation in accordance with the fourth embodiment of the present invention.

For example, a braking operation may be started when the right rear wheel RR is not subjected to the anti-skid control. The wheel speed of the right rear wheel RR is faster than that of the left front wheel FL, with a speed difference larger than the predetermined value. In this condition, the pressurization control valve 300 for the right rear wheel RR is in the opened condition. The hydraulic braking pressure supplied from the master cylinder 3 is increased by the delivery function of pump 101 and the presence of proportional control valve 90. The hydraulic braking pressure thus-increased is applied to the wheel cylinder 4 of the right rear wheel RR through the pressurized control valve 300 and the proportional control valve 400. Thus, a braking force applied to the right rear wheel RR is increased quickly. More specifically, at time t1 as shown in the time chart of FIG. 13, a speed difference exceeding the predetermined value is caused between the left front wheel FL and the right rear wheel RR. After this time t1, the hydraulic braking pressure of the right rear wheel RR is increased speedily as indicated by a solid line. Thus, the braking force of right rear wheel RR increases rapidly, as shown in FIG. 14. The wheel speed of right rear wheel RR is decreased quickly and approaches the wheel speed of the left rear wheel FL.

Accordingly, a sufficient braking force is generated for rear wheels before the driver depresses the braking pedal 1 deeply. An excellent braking performance can be realized. A dotted line of FIG. 13 shows the wheel behavior to be observed when the above-described speed difference elimination processing is not performed. In this case, the braking force of right rear wheel RR is not increased sufficiently. It is therefore difficult for the vehicle to realize an excellent braking performance as a whole.

The above-described speed difference elimination processing is performed by utilizing the pressurization of the hydraulic braking pressure. This speed difference elimination processing is applied to any wheel that is not subjected to the anti-skid control and has a wheel speed larger than that of the right front wheel FL with a speed difference exceeding the predetermined value. With this processing, the behavior of every wheel is equalized to the one shown by the solid line in FIG. 14. Accordingly, an excellent braking performance can be realized without causing the rear wheels from locking early.

Figure 12:
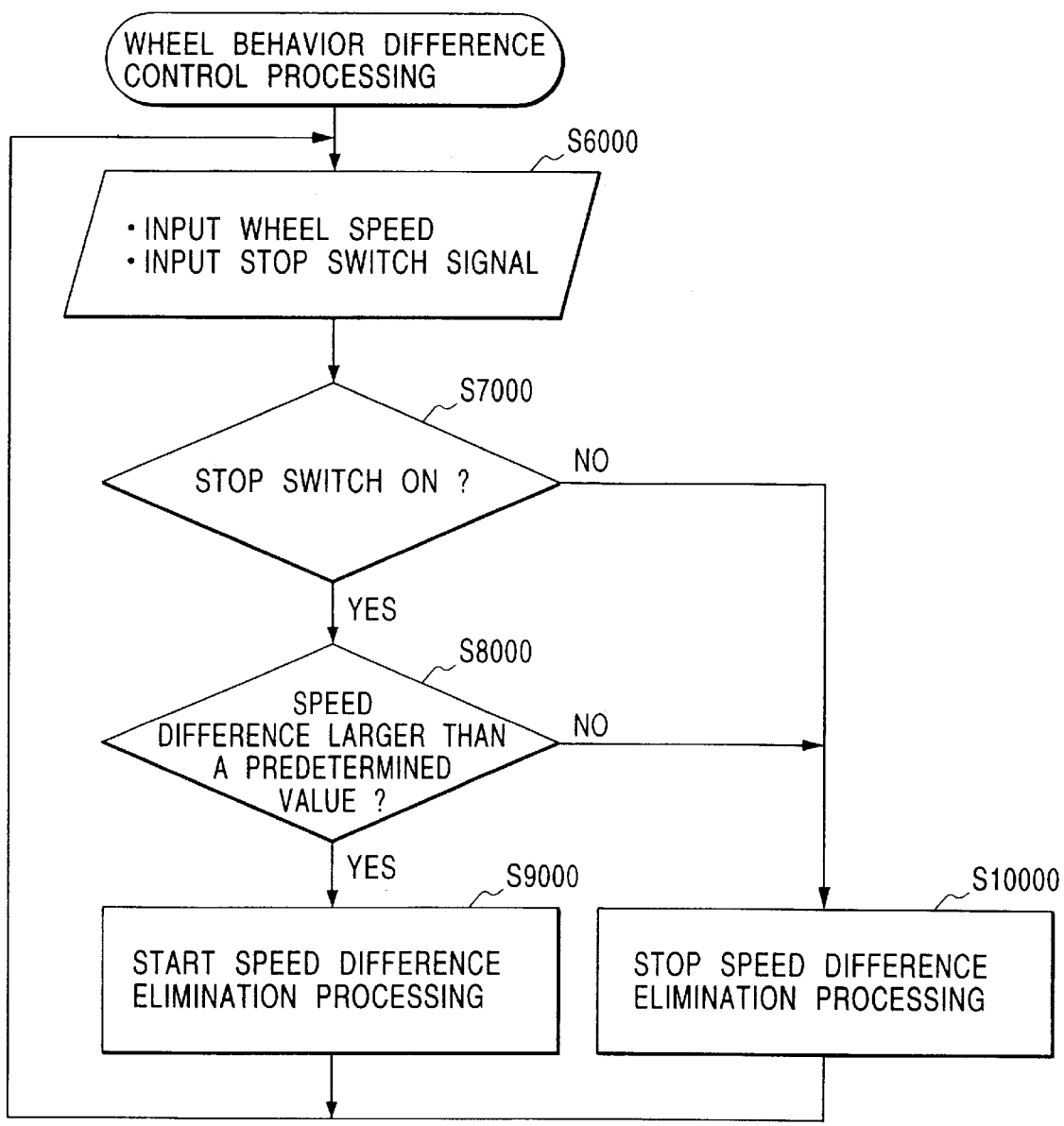
FIG. 12 is a flowchart showing a wheel behavior difference control processing performed by an electronic control unit for an anti-skid system in accordance with the fourth embodiment of the present invention.

When the stop switch is not on (i.e., NO) at step S7000, or when the speed difference is smaller than the predetermined value (i.e., NO) at step S8000, the speed difference elimination processing started at step S9000 is ceased (S10000) (See FIG. 12). To prevent any hunting between the processing of step S9000 and the processing of step S10000, an adequate hysteresis is provided in the speed difference judgement in step S8000.

The processing performed at the step S6000 corresponds to the function of the wheel behavior difference detecting means of the present invention. The processing performed at the step S9000 corresponds to the function of the wheel behavior difference elimination means of the present invention.

Still further, the braking force control processing explained with reference to the flowchart shown in FIG. 3 can be also performed by the braking system shown in FIGS. 10 and 11 that is equipped with the components for the anti-skid control.

Fifth embodiment

Figure 16:
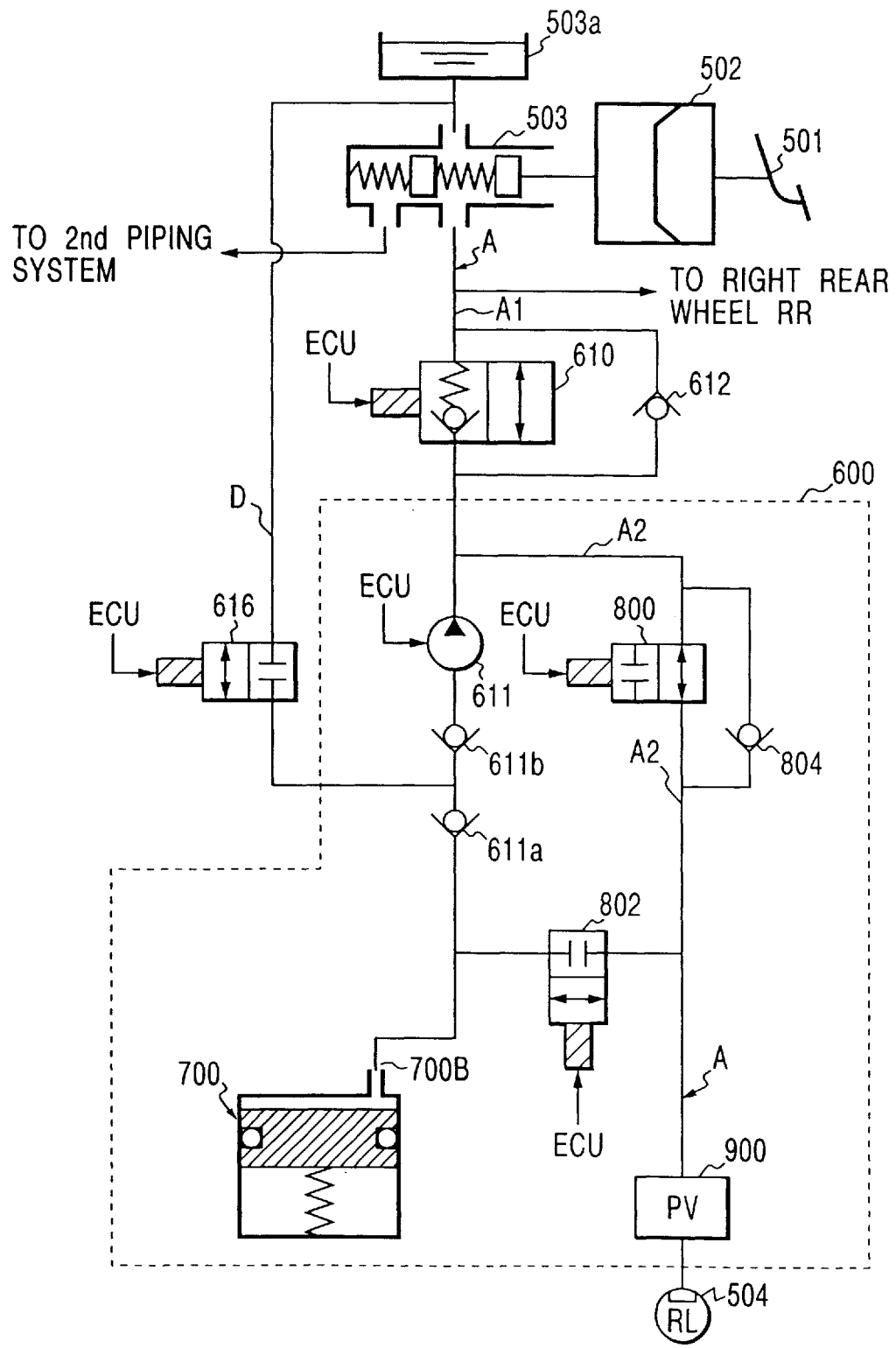
FIG. 16 is a schematic view showing a brake piping model for rear wheels in accordance with a fifth embodiment of the present invention.
Figure 17:
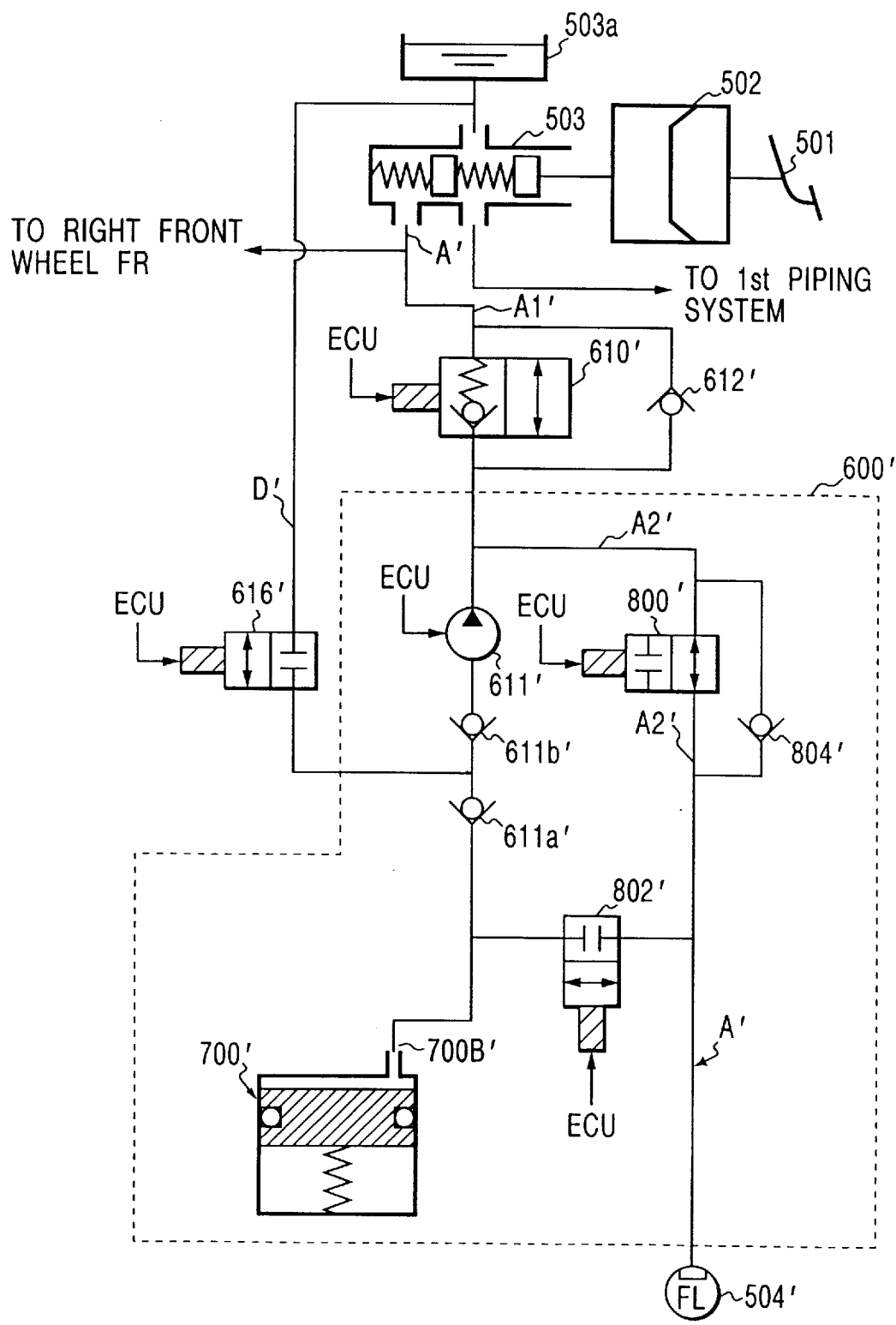
FIG. 17 is a schematic view showing a brake piping model for front wheels in accordance with the fifth embodiment of the present invention.

FIGS. 16 and 17 are views cooperatively showing a brake piping model in accordance with a fifth embodiment of the present invention. FIG. 16 shows a rear brake piping system for right and left rear wheels. FIG. 17 shows a front brake piping system for right and left front wheels. The fifth embodiment of the present invention shows a braking apparatus incorporated in a four-wheel, front-drive automotive vehicle comprising both of an FL-FR brake piping system and an RL-RR brake piping system. FIG. 16 chiefly explains the arrangement for the left rear wheel RL. However, this arrangement is equally applied to the right rear wheel RR. Thus, only the left rear wheel RL will be explained hereinafter and the explanation for the right rear wheel RR is omitted. FIG. 17 chiefly explains the arrangement for the left front wheel FL. However, this arrangement is equally applied to the right front wheel FR. Thus, only the left front wheel FL will be explained hereinafter and the explanation for the right front wheel FR is omitted. As shown in FIG. 17, the front brake piping system is substantially identical with the rear brake piping system except that no proportional control valve is provided in front of wheel cylinder 504'.

Accordingly, any parts identical with those shown in FIG. 16 are denoted by the same reference numeral but affixed by "'" and not explained in the following description.

A braking pedal 501, a vacuum servo device 502, a master cylinder 503, a master reservoir 503a, a pump 611, pressurization control valve 800, a depressurization control valve 802, a safety valve 804, a proportional control valve 900 and a wheel cylinder 504 are substantially identical with the braking pedal 1, the vacuum servo device 2, the master cylinder 3, the master reservoir 3a, the pump 101, the pressurization control valve 300, the depressurization control valve 302, the safety valve 304, the proportional control valve 400 and the wheel cylinder 4 explained in the fourth embodiment. Thus, these components are not explained in the following description.

The fifth embodiment is different from the fourth embodiment in that the proportional control valve 90 is replaced by a master cut valve 610 (corresponding to the control valve of the present invention) that is disposed in the piping passage "A" at an intermediate portion between the master cylinder 503 and an anti-skid system 600.

Figure 18:
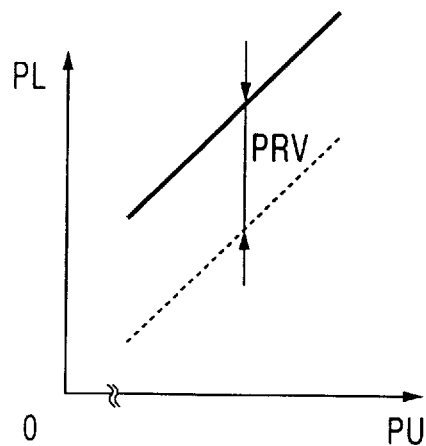
FIG. 18 is a graph showing a function of a master cut valve in accordance with the fifth embodiment of the present invention.

The master cut valve 610 comprises a port with a differential pressure valve (corresponding to the second control condition) and a port realizing a communicating condition (corresponding to the first control condition). In an ordinary condition, the master cut valve 610 is in the communicating condition. When the hydraulic braking pressure is controlled by the anti-skid system 600, the master cut valve 610 is switched to the other state acting as the differential pressure valve. A differential pressure PRV can be provided between the first piping passage A1 and the second piping passage A2, so that the hydraulic pressure of the second piping passage A2 is always higher than that of the first piping passage A1 as shown in FIG. 18. This switching operation for the master cut valve 610 is executed by an electronic control unit ECU for the anti-skid system 600. The anti-skid system 600 and the electronic control unit ECU cooperatively act as the hydraulic braking pressure regulating means.

Figure 19:
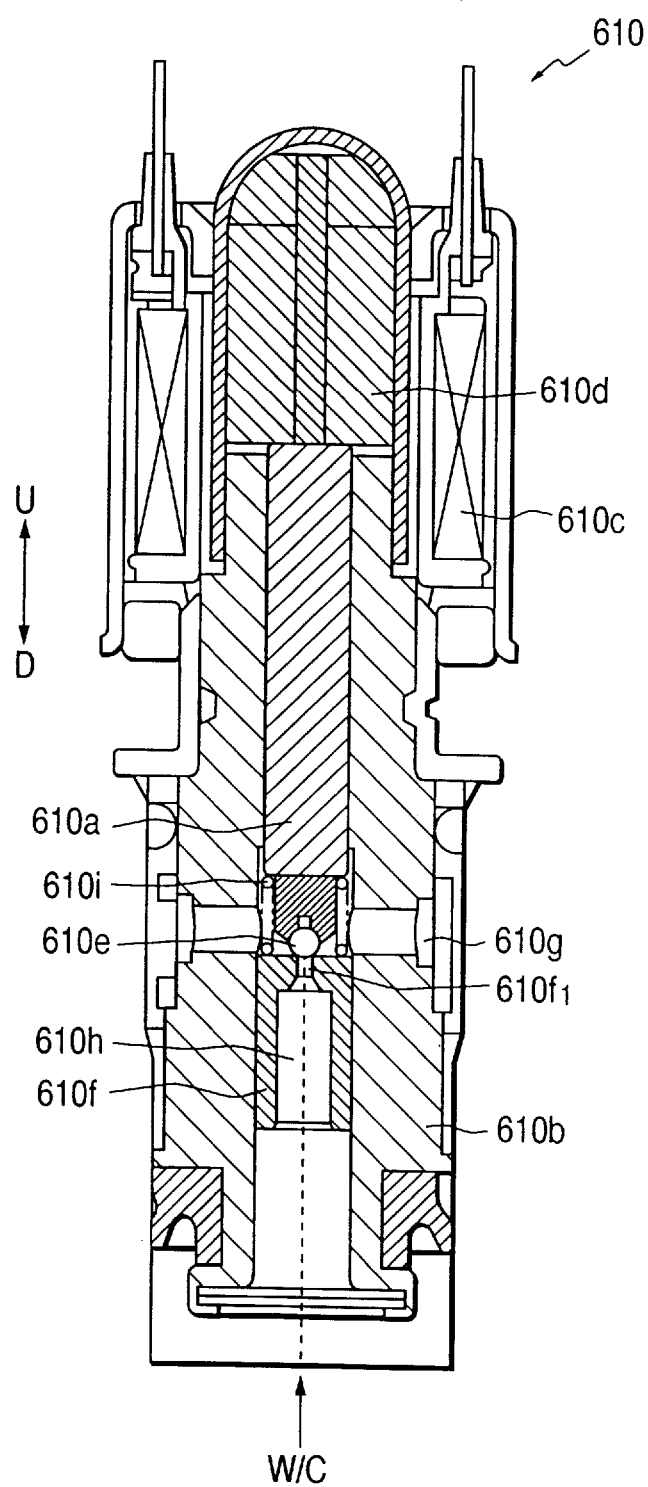
FIG. 19 is a view showing a detailed arrangement of the master cut valve in accordance with the fifth embodiment of the present invention.
Figure 20:
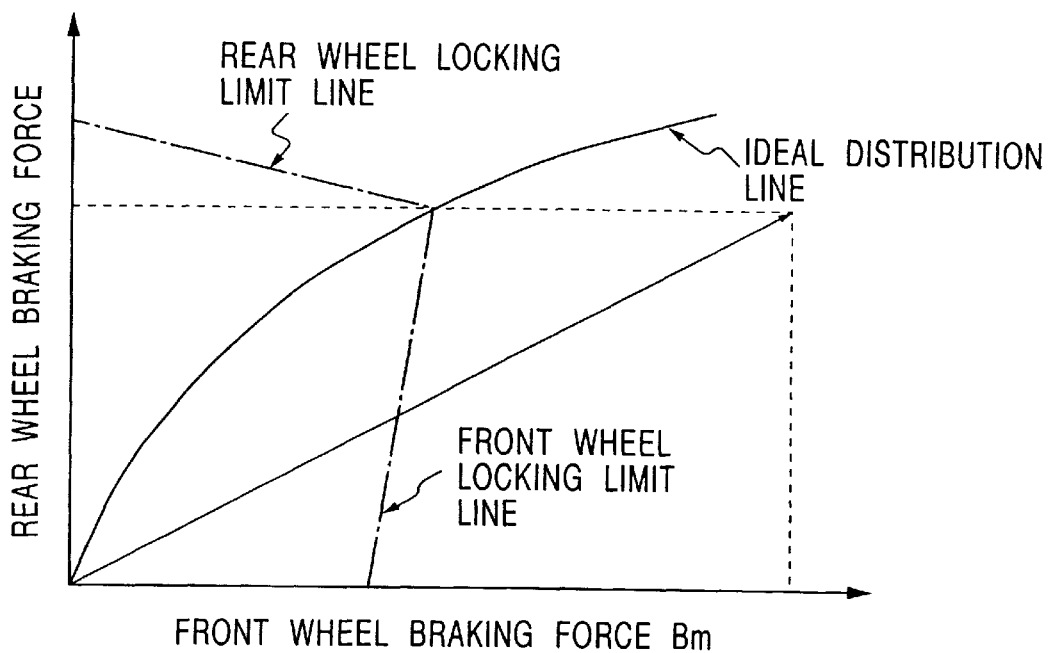
FIG. 20 is a view showing variations of braking forces applied to front and rear wheels during a braking operation in accordance with a prior art.
Figure 21:
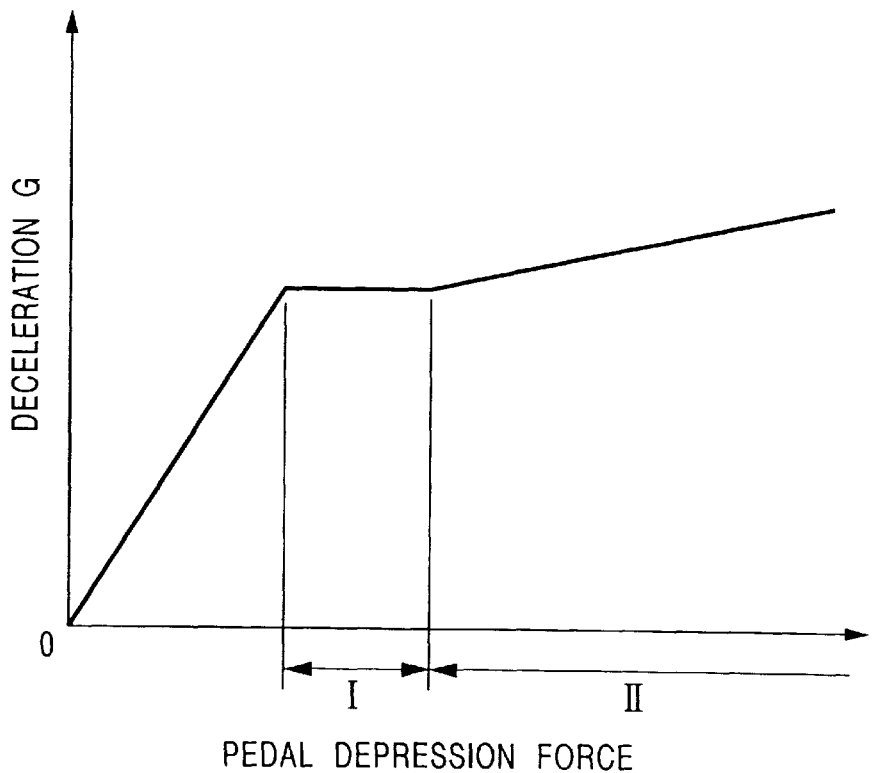
FIG. 21 is a view showing a variation of deceleration G during a deceleration in accordance with a prior art.

An arrangement of the master cut valve 610 is shown in greater detail in FIG. 19. A shaft 610a is slidable in an U-and-D direction. The shaft 610a is inserted in a guide 610b. A plunger 610d is connected to the rear end of shaft 610a and is actuated by an energizing force of coil 610c. The plunger 610d shifts the shaft 610a. A ball 610e is provided at the front end of the shaft 610a. The ball 610e opens or closes a piping passage "A." A sheet 610f has a small-diameter opening 610f1. The ball 610e closes the opening 610f1. A spring 610i urges the shaft 610a in the direction of arrow U. The master cylinder 503 and the wheel cylinder 504 is connected by an oil passage (indicated by a dotted line) passing through a master cylinder communication hole 610g, a clearance defined between ball 610e and sheet 610f, and a wheel cylinder communication hole 610h communicating with the opening 610f1.

In this master cut valve 610, the shaft 610a is usually urged by a resilient force of the spring 610i so as to shift in the direction of arrow U. In this ordinary condition, the oil passage is opened. When the coil 610c is energized, the shaft 610a shifts in the direction of arrow D against the urgent force of spring 610i until the ball 610e closes the opening 610f1. Thus, the oil passage is closed.

A depression-increase valve 612, disposed in parallel with the master cut valve 610, permits the brake fluid to flow from master cylinder 503 into the wheel cylinder 504 in response to a further depression of the braking pedal 501 by the driver.

With this arrangement, even if the second hydraulic pressure PL is increased with respect to the master cylinder pressure PU, the second hydraulic pressure PL is maintained unless the pressurized level exceeds the differential pressure PRV. Furthermore, the master cut valve 610 may be accidentally locked at the valve position serving as the differential pressure valve. The pump 611 (corresponding to the delivery means of the present invention) may malfunctions in its operation. In this respect, providing the depression-increase valve 612 is advantageous in that the master cylinder pressure PU can be surely supplied to the wheel cylinder 504 in such emergent cases.

A reservoir 700 is located outside the piping system and is connected to a brake fluid suction side of pump 611. The reservoir 700 stores brake fluid flowing into the inside of reservoir 700 from a reservoir hole 700B. When required, the brake fluid stored in the reservoir 700 is sent out to the outside.

A piping passage "D" is provided between the master reservoir 503a to the suction side of pump 611. An intake control valve 616 is disposed in this piping passage D. The intake control valve 616 is a two-way valve capable of controlling its open/close condition in accordance with a control signal sent from the electronic control unit ECU for the anti-skid system 600. A brake control performed by the electronic control unit ECU for the anti-skid system 600 is fundamentally identical with the wheel behavior difference control processing explained with reference to FIG. 12, although the content of the speed difference elimination processing at the step S9000 is changed in the following manner.

More specifically, the speed difference elimination processing of step S9000 is applied to any wheel that is not subjected to the anti-skid control and has a wheel speed exceeding the predetermined value. The master cut valves 610, 610' for the designated wheels are switched to the differential-pressure valve condition. The intake control valves 616, 616' corresponding to these master cut valves 610, 610' are switched to the opened condition. Furthermore, the pumps 611, 611' corresponding to the designated wheels are activated. With the above-described switching operation, the brake fluid is delivered from the master reservoir 503a to the piping passages A2, A2' via the piping passages D, D'. The master cut valves 610, 610', situated in the differential pressure valve condition, are disposed between the second piping passages A2, A2' and the first piping passages A1, A1'. Thus, the hydraulic braking pressure level of the second piping passages A2, A2' can be maintained at a level higher than that of the master cylinder 503 with a pressure difference equivalent to the differential pressure PRV as shown in FIG. 18.

In this case, the designated wheels are not subjected to the anti-skid control as described above. Therefore, the pressurization control valves 800, 800' are in the opened condition. The hydraulic braking pressure pressurized than that of the master cylinder 503 is applied to wheel cylinder 504 via pressurization control valve 800 and proportional control valve 900 and to wheel cylinder 504' via pressurization control valve 800'. Thus, the braking force is increased quickly. That is, the hydraulic braking pressure starts increasing at a higher speed in the same manner as the example shown in FIGS. 13 and 14. The braking force is increased quickly. The wheel speed is reduced quickly and approaches the speed of the left front wheel FL. Accordingly, a sufficient braking force is generated for every wheel without requiring a deep depression of the braking pedal 501 by the driver. This realizes an excellent braking performance comparable with that of the above-described fourth embodiment.

When the speed difference elimination processing is stopped, master cut valves 610, 610' are switched to communicating conditions. Intake control valves 616, 616' are switched to closed conditions. Furthermore, pumps 611 and 611' are stopped.

Furthermore, the brake piping arrangement of the fifth embodiment can be further applied to the braking force control processing explained with reference to FIG. 3.

The above-described fourth and fifth embodiments are incorporated in the four-wheel front drive vehicle consisting of the FL-FR brake piping system and the RL-RR brake piping system. However, the present invention can be applied to a rear drive vehicle, or a two-wheel vehicle, any other dual braking system (e.g., an X piping arrangement braking system), or an independent brake piping system dedicated to each wheel.

The present invention performs a braking force control for increasing a hydraulic braking pressure applied to a wheel cylinder when the deceleration or its change is large as explained with reference to the first to third embodiments. Meanwhile, the present invention performs a wheel behavior difference elimination control for increasing an increased hydraulic braking pressure to a designated wheel cylinder as explained with reference to the fourth and fifth embodiments. Needless to say, the braking force control and the wheel behavior difference elimination control can be executed by using the same braking system. Thus, the braking systems disclosed in the fourth and fifth embodiments can be used for executing the braking force control of the present invention. Similarly, the braking systems disclosed in the first to third embodiments can be used for executing the wheel behavior difference elimination control of the present invention.

According to the arrangement shown in FIGS. 10 and 11, every wheel cylinder is associated with a reservoir (200, 200') and proportional control valve (90, 90') exclusively provided. However, it is possible to commonly use a single reservoir and a proportional control valve for all wheels. To eliminate a wheel behavior difference, one wheel cylinder may be supplied an increased hydraulic braking force and other wheel cylinder may be supplied a non-increased hydraulic braking force. In this case, the pressurization control valve for the anti-skid control will be situated in a closed condition.

Furthermore, it is possible to execute the braking force control prior to the wheel behavior difference elimination control. For example, in the flowchart of FIG. 12, a judgement step (for example, S8500) will be interposed between steps S8000 and S9000. In this judgement step, it is checked whether the braking force control (S4000 of FIG. 3 or 9) is being executed. And, if the braking force control is executed, the speed difference elimination processing of S9000 is suspended for a while.

Alternatively, it is possible to execute the wheel behavior difference elimination control prior to the braking force control. In this case, in the flowchart of FIG. 3 or 9, a judgement step (for example, S3500) will be interposed between steps S3000 (S3000') and S4000. In this judgement step, it is checked whether the wheel behavior difference elimination control (S9000 of FIG. 12) is being executed. And, if the wheel behavior difference elimination control is executed, the pressurization control processing of S4000 is suspended for a while.

Furthermore, it is possible to prohibit the wheel behavior difference elimination control unless the braking force control is being executed, so that the vehicle body behavior is stabilized only when a driver wants a strong braking operation. In this case, in the flowchart of FIG. 12, a judgement step is interposed between the steps S8000 and S4000 to judge the braking force control of step S4000 is being executed. If the braking force control of step S4000 is not being executed, the wheel behavior difference elimination control is prohibited.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A braking apparatus for automotive vehicles having a plurality of wheels, comprising:

a master cylinder generating a hydraulic braking pressure in accordance with a brake operating condition representing a driver's braking operation;

a wheel cylinder for receiving said hydraulic braking pressure supplied from said master cylinder and generating a braking force applied to a corresponding one of the wheels;

a main brake piping system connecting said master cylinder to said wheel cylinder;

a pressurization control valve provided in said main brake piping system for increasing or holding a pressure level of said hydraulic braking pressure supplied from said master cylinder for supplying adjusted brake fluid to said wheel cylinder;

a depressurization control valve for decreasing or holding a pressure level of said adjusted brake fluid supplied to said wheel cylinder;

a pump for supplying braking fluid to said main brake piping system between said master cylinder and said pressurization control valve;

a pressure difference holding valve interposing between said master cylinder and an outlet of said pump in said main brake piping system for holding said braking fluid supplied from said pump at a pressure level higher than said hydraulic braking pressure supplied from said master cylinder;

an auxiliary brake piping system connecting said master cylinder to an inlet of said pump;

a reservoir connected to said auxiliary brake piping system for storing a predetermined amount of brake fluid for being supplied to said pump;

wheel speed sensors provided for a plurality of the wheels, including the corresponding one of the wheels, for independently detecting wheel speeds of the sensed wheels and generating corresponding signals; and a wheel speed adjusting means for activating said pump and at least one of said pressurization control valve and said depressurization control valve based on signals obtained from said wheel speed sensors to produce an increased hydraulic braking pressure higher than said hydraulic braking pressure generated from said master cylinder, and supplying said increased hydraulic braking pressure to said wheel cylinder.

2. The braking apparatus for automotive vehicles in accordance with claim 1, wherein said brake fluid supplied to said wheel cylinder is returned to a reservoir chamber of said reservoir only when said depressurization control valve is opened, and brake fluid is supplied from said master cylinder to said reservoir chamber when said pump is operated and a residual amount of said brake fluid stored in said reservoir is less than said predetermined amount.

3. The braking apparatus for automotive vehicles in accordance with claim 2, wherein said reservoir has a check valve limiting the brake fluid flowing into said reservoir chamber from said master cylinder to maintain the residual amount of said brake fluid stored in said reservoir.

4. The braking apparatus for automotive vehicles in accordance with claim 1, wherein the plurality of wheels includes a rear wheel, and wherein said wheel speed adjusting means increases the level of the hydraulic braking pressure applied to the rear wheel.

5. The braking apparatus for automotive vehicles in accordance with claim 1, wherein said wheel speed adjusting means increases the level of the hydraulic braking pressure applied to all wheels.

6. The braking apparatus for automotive vehicles in accordance with claim 1, wherein said pressure difference holding valve is a proportional control valve holding a ratio of a hydraulic braking pressure supplied from said pump to the hydraulic braking pressure produced from said master cylinder.

7. The braking apparatus for automotive vehicles in accordance with claim 1, wherein said pressure difference holding valve is a master cut valve disposed in said main brake piping system and having a first control condition where said main brake piping system is in a communicating condition and a second control condition where a pressure difference is maintained between a hydraulic braking pressure supplied from said pump and the hydraulic braking pressure produced from said master cylinder, and said master cut valve is in said second control condition when the brake fluid is supplied from said pump.

8. The braking apparatus for automotive vehicles in accordance with claim 1, wherein said wheel speed adjusting means controls both of said pressurization control valve and said depressurization control valve to regulate the hydraulic braking pressure applied to said wheel cylinder in accordance with a road surface friction limit during a braking condition of an associated wheel, so as to optimize the braking behavior of the wheel.

9. The braking apparatus for automotive vehicles in accordance with claim 8, further including at least one additional said wheel cylinder, and wherein said wheel speed adjusting means operates for depressurizing one of said wheel cylinders, while said pump utilizes brake fluid drained from said one of said wheel cylinders to increase the hydraulic braking pressure of another of said wheel cylinders.

10. The braking apparatus for automotive vehicles in accordance with claim 1, further including at least one additional said wheel cylinder, and wherein said wheel speed adjusting means differentiates a pressurization degree of the brake fluid for each of said wheel cylinders.

11. The braking apparatus for automotive vehicles in accordance with claim 10, wherein the plurality of wheels includes a front wheel and a rear wheel, and wherein said wheel speed adjusting means applies a pressurization degree of the brake fluid for said one of wheel cylinders corresponding to the rear wheel set larger than a pressurization degree for another of said wheel cylinders corresponding to the front wheel.

12. braking apparatus for automotive vehicles having a plurality of wheels, comprising:

a master cylinder generating a hydraulic braking pressure in accordance with a brake operating condition representing a driver's braking operation;

a plurality of wheel cylinders, each said wheel cylinder receiving said hydraulic braking pressure supplied from said master cylinder and generating a braking force applied to a corresponding one of the wheels;

a main brake piping system connecting said master cylinder to said wheel cylinder;

a pressurization control valve provided in said main brake piping system for increasing or holding a pressure level of said hydraulic braking pressure supplied from said master cylinder for supplying adjusted brake fluid to said wheel cylinder;

a depressurization control valve for decreasing or holding a pressure level of said adjusted brake fluid supplied to said wheel cylinder;

a pump for supplying braking fluid to said main brake piping system between said master cylinder and said pressurization control valve;

a pressure difference holding valve interposing between said master cylinder and an outlet of said pump in said main brake piping system for holding said braking fluid supplied from said pump at a pressure level higher than said hydraulic braking pressure supplied from said master cylinder;

an auxiliary brake piping system connecting said master cylinder to an inlet of said pump;

a reservoir connected to said auxiliary brake piping system for storing a predetermined amount of brake fluid for being supplied to said pump;

wheel speed sensors provided for a plurality of the wheels, including the corresponding one of the wheels, for independently detecting wheel speeds of the sensed wheels;

a wheel deceleration calculating means for calculating a deceleration degree of each sensed wheel based on said speed sensors;

a judging means for judging whether the corresponding wheel has a deceleration degree exceeding a predetermined value based on a calculation result of said wheel deceleration calculating means; and a braking force control means for activating said pump and at least one of said pressurization control valve and said depressurization control valve based on a judgement result of said judging means to produce an increased hydraulic braking pressure higher than said hydraulic braking pressure generated from said master cylinder, to adjust the hydraulic braking pressure applied to the corresponding wheel if it has a deceleration degree exceeding the predetermined value.

13. A braking apparatus for automotive vehicles having a plurality of wheels, comprising:

a master cylinder generating a hydraulic braking pressure in accordance with a brake operating condition representing a driver's braking operation;

a wheel cylinder for receiving said hydraulic braking pressure supplied from said master cylinder and generating a braking force applied to a corresponding one of the wheels;

a main brake piping system connecting said master cylinder to said wheel cylinder;

a pressurization control valve provided in said main brake piping system for increasing or holding a pressure level of said hydraulic braking pressure supplied from said master cylinder for supplying adjusted brake fluid to said wheel cylinder;

a depressurization control valve for decreasing or holding a pressure level of said adjusted brake fluid supplied to said wheel cylinder;

a pump for supplying braking fluid to said main brake piping system between said master cylinder and said pressurization control valve;

a pressure difference holding valve interposing between said master cylinder and an outlet of said pump in said main brake piping system for holding said braking fluid supplied from said pump at a pressure level higher than said hydraulic braking pressure supplied from said master cylinder;

an auxiliary brake piping system connecting said master cylinder to an inlet of said pump;

a reservoir connected to said auxiliary brake piping system for storing a predetermined amount of brake fluid for being supplied to said pump;

vehicle body deceleration detecting means for detecting a deceleration degree of a vehicle body;

a judging means for judging whether the deceleration degree of said vehicle body exceeds a predetermined value based on a detection result of said vehicle body deceleration detecting means; and a braking force control means for activating said pump and at least one of said pressurization control valve and said depressurization control valve based on a judgement result of said judging means to produce an increased hydraulic braking pressure higher than said hydraulic braking pressure generated from said master cylinder, to adjust the braking force applied to the corresponding wheel.

14. A braking apparatus for automotive vehicles having a plurality of wheels, comprising:

a master cylinder generating a hydraulic braking pressure in accordance with a brake operating condition representing a driver's braking operation;

a wheel cylinder receiving said hydraulic braking pressure supplied from said master cylinder and generating a braking force applied to a corresponding one of the wheels;

a main brake piping system connecting said master cylinder to said wheel cylinder;

a pressurization control valve provided in said main brake piping system for increasing or holding a pressure level of said hydraulic braking pressure supplied from said master cylinder for supplying adjusted brake fluid to said wheel cylinder;

a depressurization control valve for decreasing or holding a pressure level of said adjusted brake fluid supplied to said wheel cylinder;

a pump for supplying braking fluid to said main brake piping system between said master cylinder and said pressurization control valve;

a pressure difference holding valve interposing between said master cylinder and an outlet of said pump in said main brake piping system for holding said braking fluid supplied from said pump at a pressure level higher than said hydraulic braking pressure supplied from said master cylinder;

an auxiliary brake piping system connecting said master cylinder to an inlet of said pump;

a reservoir connected to said auxiliary brake piping system for storing a predetermined amount of brake fluid for being supplied to said pump;

wheel speed sensors provided for a plurality of the wheels, including the corresponding one of the wheels, for independently detecting wheel speeds of the sensed wheels;

a comparing means for obtaining a speed difference between any of the sensed wheels based on said speed sensors;

a judging means for judging whether the speed difference between the corresponding wheel and any other sensed wheel exceeds a predetermined value based on a speed difference result of said comparing means; and a braking force control means for activating said pump and at least one of said pressurization control valve and said depressurization control valve based on a judgement result of said judging means to produce an increased hydraulic braking pressure higher than said hydraulic braking pressure generated from said master cylinder, to adjust the braking force applied to the corresponding wheel to thereby reduce the speed difference between the corresponding wheel and any other sensed wheel.

15. A braking apparatus for automotive vehicles having a plurality of wheels, comprising:

a master cylinder generating a hydraulic braking pressure in accordance with a brake operating condition representing a driver's braking operation;

a wheel cylinder for receiving said hydraulic braking pressure supplied from said master cylinder and generating a braking force applied to a corresponding one of the wheels;

a main brake piping system connecting said master cylinder to said wheel cylinder;

a pressurization control valve provided in said main brake piping system for increasing or holding a pressure level of said hydraulic braking pressure supplied from said master cylinder for supplying adjusted brake fluid to said wheel cylinder;

a depressurization control valve for decreasing or holding a pressure level of said adjusted brake fluid supplied to said wheel cylinder;

a pump for supplying braking fluid to said main brake piping system between said master cylinder and said pressurization control valve;

a pressure difference holding valve interposing between said master cylinder and an outlet of said pump in said main brake piping system for holding said braking fluid supplied from said pump at a pressure level higher than said hydraulic braking pressure supplied from said master cylinder;

an auxiliary brake piping system connecting said master cylinder to an inlet of said pump;

a reservoir connected to said auxiliary brake piping system for storing a predetermined amount of brake fluid for being supplied to said pump;

wheel behavior sensors provided for a plurality of the wheels, including the corresponding one of the wheels, for independently detecting wheel behavior of the sensed wheels and generating corresponding signals;

a wheel behavior comparing device for detecting differences in the behavior of the corresponding wheel and any of the sensed wheels based on signals from said wheel behavior sensors;

a wheel behavior judging device for judging whether detected differences in wheel behavior exceed a predetermined limit; and a wheel behavior control unit for activating said pump and at least one of said pressurization control valve and said depressurization control valve based on a judgment result of said judging device to produce an increased hydraulic braking pressure higher than said hydraulic braking pressure generated from said master cylinder and supplying said increased hydraulic braking pressure to said wheel cylinder to reduce detected differences in wheel behavior.

\* \* \* \* \*